(12) United States Patent
Mao et al.

(10) Patent No.: US 9,800,193 B2
(45) Date of Patent: Oct. 24, 2017

(54) DYNAMICALLY RECONFIGURABLE MOTORS AND GENERATORS AND SYSTEMS

(71) Applicants: Hengchun Mao, Allen, TX (US); Xuezhong Jia, Allen, TX (US)

(72) Inventors: Hengchun Mao, Allen, TX (US); Xuezhong Jia, Allen, TX (US)

( * ) Notice: Subject to any disclaimer, the term of this patent is extended or adjusted under 35 U.S.C. 154(b) by 0 days.

(21) Appl. No.: 15/095,024

(22) Filed: Apr. 9, 2016

(65) Prior Publication Data

US 2016/0301348 A1     Oct. 13, 2016

Related U.S. Application Data

(63) Continuation-in-part of application No. 14/467,027, filed on Aug. 24, 2014, now Pat. No. 9,490,740, which is a continuation-in-part of application No. 14/185,892, filed on Feb. 20, 2014, now Pat. No. 9,240,748.

(60) Provisional application No. 61/852,335, filed on Mar. 15, 2013.

(51) Int. Cl.
*H02P 6/00* (2016.01)
*H02P 25/20* (2006.01)
*H02P 25/22* (2006.01)
*H02P 25/18* (2006.01)
*H02K 3/28* (2006.01)

(52) U.S. Cl.
CPC ............... *H02P 25/20* (2013.01); *H02K 3/28* (2013.01); *H02P 25/18* (2013.01); *H02P 25/188* (2013.01); *H02P 25/22* (2013.01)

(58) Field of Classification Search
CPC .......... H02K 3/28; H02K 11/33; H02K 16/04; H02K 17/12; H02K 19/20; H02K 21/48; H02K 1/02; H02K 21/222; H02K 21/24; H02K 29/03; H02K 29/06; H02K 49/06; H02K 7/09; H02K 7/1838; H02K 21/28
USPC ........... 318/400.01, 400.22, 400.36; 310/179
See application file for complete search history.

(56) References Cited

U.S. PATENT DOCUMENTS

| | | | | | |
|---|---|---|---|---|---|
| 3,784,888 | A | * | 1/1974 | Geiersbach | H02P 6/24 318/400.01 |
| 3,840,790 | A | * | 10/1974 | Stich | H02P 6/08 318/400.36 |
| 3,931,553 | A | * | 1/1976 | Stich | H02P 6/08 318/400.01 |

(Continued)

*Primary Examiner* — Paul Ip

(57) ABSTRACT

A device comprises a motor/generator having an air gap and a plurality of windings, a plurality of power converter groups, and a control system. The windings are so configured that the number of phases in a pair of poles and the number of poles of the motor/generator can be dynamically adjusted. The power converter group comprises a plurality of power converters which is coupled between an input voltage source and a plurality of windings for controlling currents in the windings. The control system is so configured such that the number of poles of the motor/generator and the number of phases in a pair of poles are dynamically adjusted, and a synchronous speed of a moving magnetic field generated by winding currents within first pair of poles is approximately equal to a synchronous speed of a second moving magnetic field generated by currents in the windings within second pair of poles.

20 Claims, 18 Drawing Sheets

(56) References Cited

U.S. PATENT DOCUMENTS

| | | | | |
|---|---|---|---|---|
| 4,749,933 A * | 6/1988 | ben-Aaron | | H02P 27/026 |
| | | | | 310/201 |
| 5,053,689 A * | 10/1991 | Woodson | | H02K 3/28 |
| | | | | 318/400.22 |
| 5,717,586 A * | 2/1998 | Luce | | H02M 7/23 |
| | | | | 363/106 |
| 6,222,331 B1 * | 4/2001 | Blum | | H02K 29/06 |
| | | | | 318/721 |
| 7,230,361 B2 * | 6/2007 | Hirzel | | H02K 21/24 |
| | | | | 310/216.074 |
| 7,615,904 B2 * | 11/2009 | Tupper | | H02K 19/20 |
| | | | | 310/179 |
| 7,656,135 B2 * | 2/2010 | Schram | | F03D 7/02 |
| | | | | 322/59 |
| 7,710,081 B2 * | 5/2010 | Saban | | H02K 3/28 |
| | | | | 290/4 R |
| 7,960,948 B2 * | 6/2011 | Saban | | H02K 3/28 |
| | | | | 310/162 |
| 8,076,814 B2 * | 12/2011 | Tupper | | H02K 19/20 |
| | | | | 310/179 |
| 8,134,270 B2 * | 3/2012 | Nishiyama | | H02K 3/28 |
| | | | | 310/156.45 |
| 2006/0208606 A1 * | 9/2006 | Hirzel | | H02K 21/24 |
| | | | | 310/268 |
| 2008/0103632 A1 * | 5/2008 | Saban | | H02K 3/28 |
| | | | | 700/286 |
| 2008/0164697 A1 * | 7/2008 | Schram | | F03D 7/02 |
| | | | | 290/44 |
| 2008/0174195 A1 * | 7/2008 | Tupper | | H02K 19/20 |
| | | | | 310/179 |
| 2010/0052626 A1 * | 3/2010 | Tupper | | H02P 9/48 |
| | | | | 322/61 |
| 2010/0244599 A1 * | 9/2010 | Saban | | H02K 3/28 |
| | | | | 310/71 |
| 2010/0289373 A1 * | 11/2010 | Nishiyama | | H02K 3/28 |
| | | | | 310/195 |
| 2015/0288271 A1 * | 10/2015 | Kuznetsov | | H01F 27/18 |
| | | | | 322/63 |

* cited by examiner

DYNAMICALLY RECONFIGURABLE MOTORS AND GENERATORS AND SYSTEMS

CROSS REFERENCE TO RELATED APPLICATIONS

This application is a continuation-in-part of US patent application Ser. No. 14/467,027 filed on Aug. 24, 2014, which is a continuation-in-part of U.S. patent application Ser. No. 14/185,892 filed on Feb. 20, 2014, now U.S. Pat. No. 9,240,748, which is related to and claims priority to U.S. Provisional Application No. 61/850,972, titled, "High Efficiency Power Amplifiers with Advanced Power Solutions" filed on Feb. 27, 2013, which is herein incorporated by reference.

TECHNICAL FIELD

The present invention relates to electrical drives and controls, and, in particular embodiments, to novel motor and generator structures, and the use of novel power electronics equipment to drive and control them.

BACKGROUND

Electrical machines (motors and generators) are widely used to process energy and power equipment. Many of their applications require the motors and generators to operate at variable speed. Power electronics equipment is also used to operate with the motors and generators in such variable speed systems, including but not limited to industrial drives, electrical vehicles, diesel-generator sets, and wind power generation. There is a strong desire to increase the efficiency of such systems, while reducing its cost and size, especially for demanding applications such as electrical cars and other transportation equipment.

Unfortunately, the motor, generator and power electronics equipment in variable speed systems usually adopted standard technologies in each area, and are usually not optimized as a whole to achieve best results. For example, so far the vast majority of the motors and generators have a three-phase structure, and the power converters working with them are of a three-phase structure too. Significant improvement is needed to further optimize system performance and reduce the system cost.

SUMMARY OF THE INVENTION

These and other problems are generally solved or circumvented, and technical advantages are generally achieved, by preferred embodiments of the present invention which provides an improved resonant power conversion.

In accordance with an embodiment, a device comprises a motor/generator having an air gap and a plurality of windings, a plurality of power converter groups, and a control system. The windings are so configured that the number of phases in a pair of poles and the number of poles of the motor/generator can be dynamically adjusted. The power converter group comprises a plurality of power converters which is coupled between an input voltage source and a plurality of windings for controlling currents in the windings. The control system is so configured such that the number of poles of the motor/generator and the number of phases in a pair of poles are dynamically adjusted, and a synchronous speed of a first moving magnetic field generated by currents in the windings within first pair of poles is approximately equal to a synchronous speed of a second moving magnetic field generated by currents in the windings within second pair of poles.

In accordance with another embodiment, a system comprises a motor/generator having a plurality of windings, a plurality of power conditioners coupled to a power source, and a plurality of power converter groups comprising a plurality of power converters. The windings are so configured that the number of phases in a pair of poles and the number of poles of the motor/generator can be dynamically adjusted. The power source comprises a plurality of input voltage sources, and a power conditioner is coupled to a coil. The input voltage sources are configured to receive energy through the power conditioners. A power converter group is coupled to an input voltage source and a group of windings for controlling currents in the windings, and the power converter groups are controlled such that the number of poles of the motor/generator and the number of phases in pair of poles are dynamically adjusted.

In accordance with yet another embodiment, a method comprises providing a power electronics system to have a plurality of power converter groups, coupling a motor/generator having a plurality of windings to the power electronics system so that each power converter group controls currents of a group of windings, and configuring a control system such that a power converter group provides a charge balance between the first input voltage source and the second input voltage source. A power converter group is coupled to an input voltage source, and a first input voltage source coupled to a first power converter group through a first positive lead and a first negative lead is in series through a middle tap with a second input voltage source coupled to a second power converter group through a second positive lead and a second negative lead.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely in a motor and motor drive system. The invention may also be applied, however, to a variety of other electrical machine and machine control systems, including generators, rectifiers, and inverters, and any combination thereof. Hereinafter, various embodiments will be explained in detail with reference to the accompanying drawings.

A variable speed system usually controls a motor to operate at or around its synchronous speed. The synchronous speed of an ac electrical machine (motor or generator) is determined by the frequency of the power supply and the number of poles of the motor according to the following relationship:

$$S = \frac{60f}{P},$$

in which S is speed in rpm, f is the power supply frequency in Hz, and P is the number of pairs of poles of the motor or generator.

Figure 1:
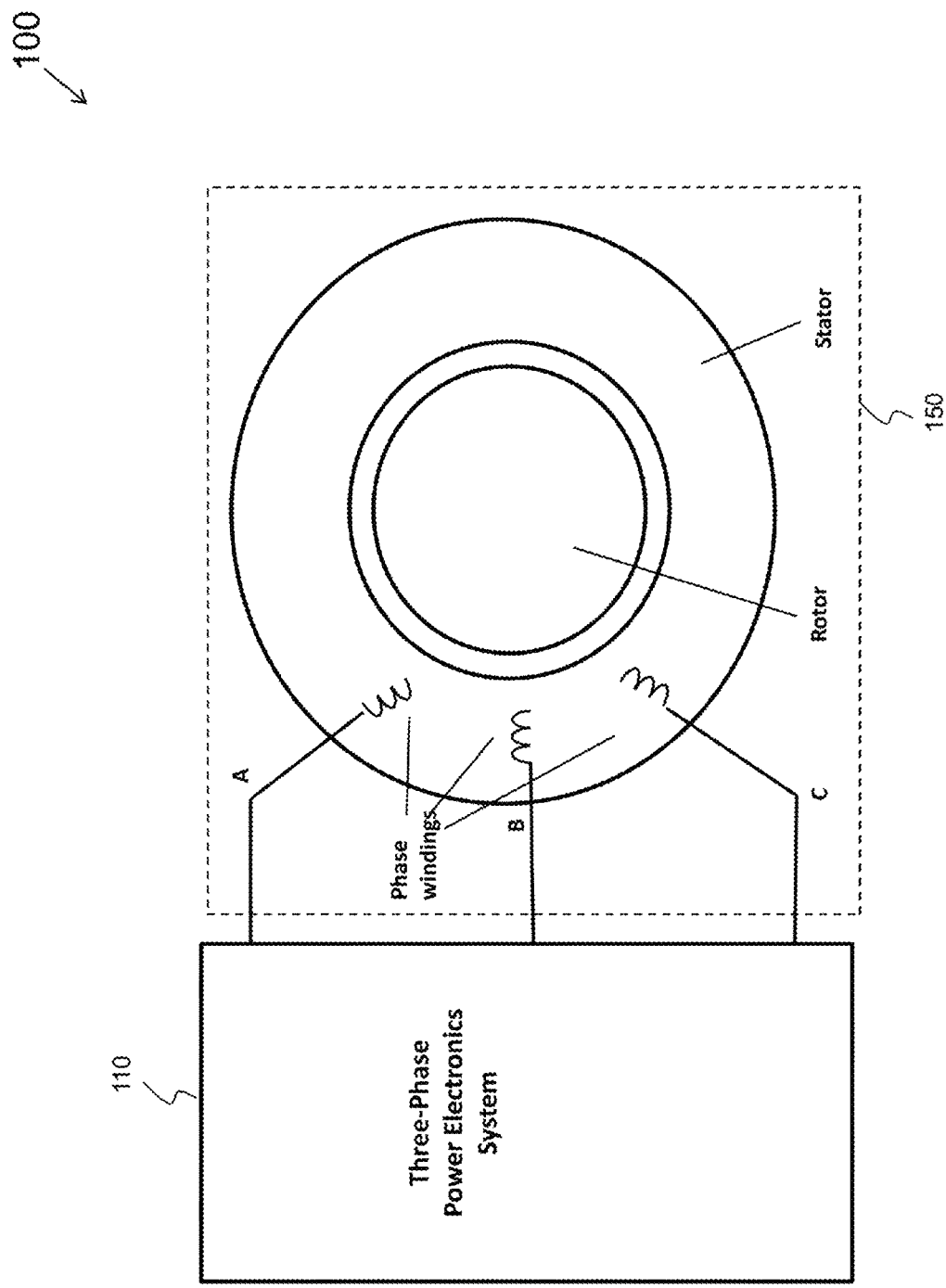
FIG. 1 illustrates a three-phase drive system with a three-phase motor and power electronics system.

Most variable speed applications use variable frequency in the power supply as the main control method, but keep the pole number constant. When the speed range is wide, the frequency range is also wide. Unfortunately, neither power electronics equipment nor motors (and generators) are good at wide frequency ranges, and usually low frequency operation and high frequency operation present big challenges to the design of power converters, motors, and generators. This often results in suboptimal performance and increases cost, volume and weight of the system. Moreover, motors and generators above a few kW are usually designed in a three-phase configuration with fixed number of poles, as is shown in FIG. 1, where a three-phase power electronics system 110 is used to power a three-phase motor 150. A three-phase motor has a rotor, a stator, and a three-phase winding consisting three phase windings (one phase winding per phase). In high power applications, each phase has to deal with high voltage and high current, which not only increases insulation and cabling requirements in the motor and the system, but also mandate parallel and/or series connection of power devices and converters in the power electronics equipment. As power semiconductor devices cannot be put in parallel or in series without extra effort, such parallel or series connection further increases the cost and the complexity of the power electronics equipment.

Figure 2:
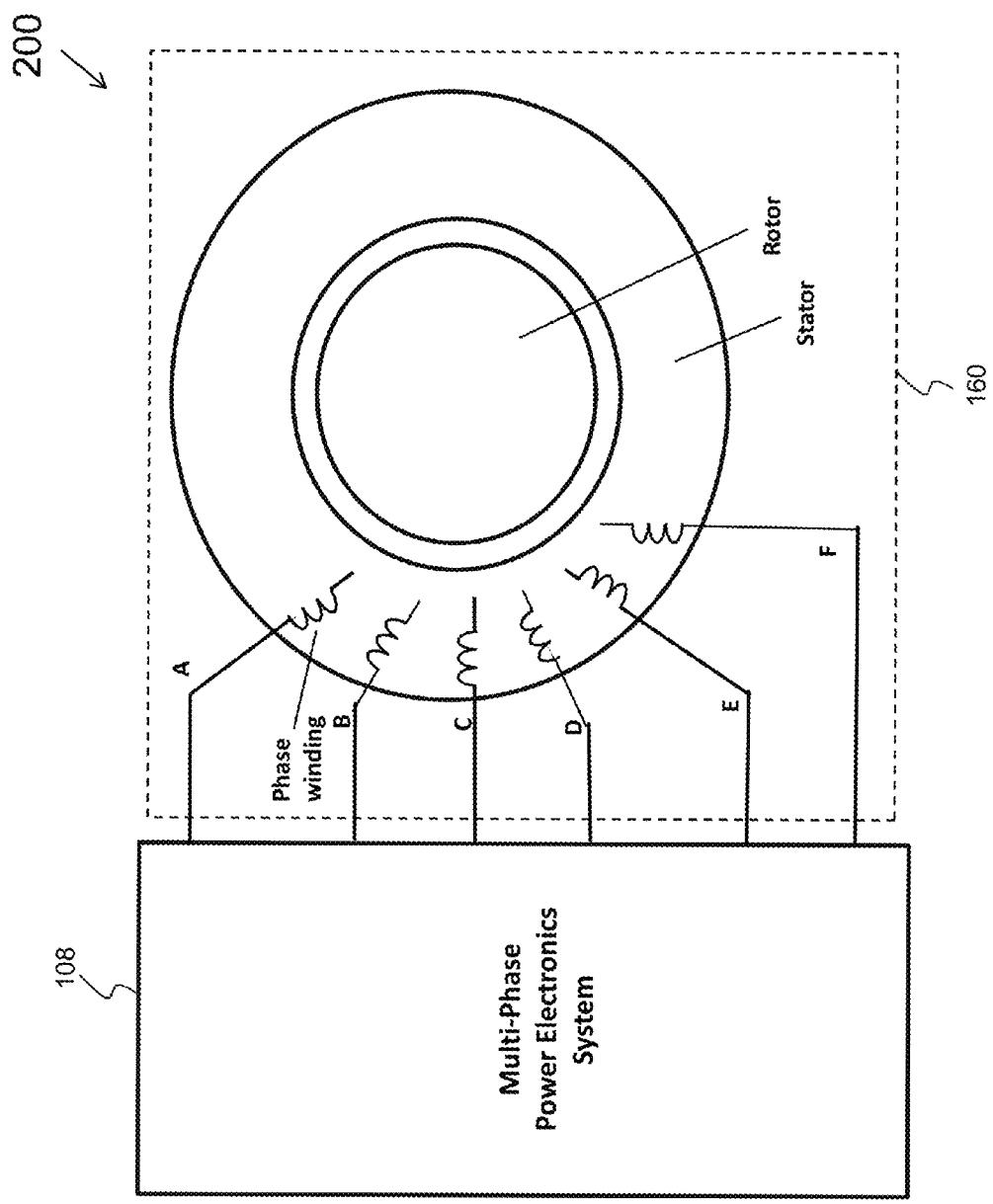
FIG. 2 illustrates a multi-phase drive system with a multi-phase motor and power electronics equipment in accordance with various embodiments of the present disclosure.
Figure 3:
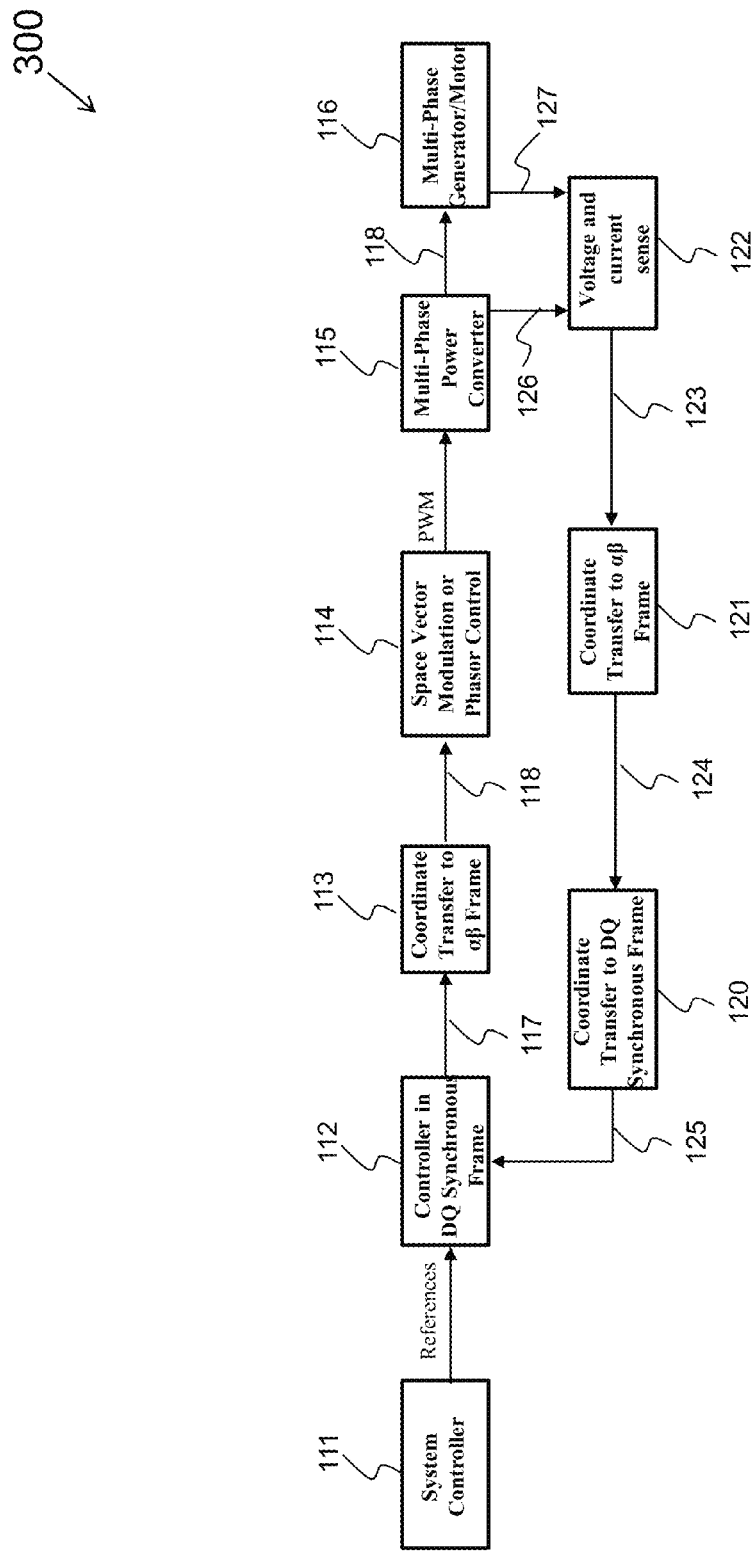
FIG. 3 illustrates a control system for a multi-phase drive system in accordance with various embodiments of the present disclosure.

To alleviate this problem, the number of phases in a high power application can be increased, so each phase processes lower power which can be handled easier by power semiconductor switches. Such a system is shown in FIG. 2, where a multi-phase power electronics system 108 powers a multi-phase motor 160. The number of phase windings of 160 is higher than 3, so each phase winding and related power electronics components in 112 deal with lower power than in a three-phase system. The voltage and current in adjacent phases of an m-phase system have a phase shift of 360°/m, where m represents the number of phases in the system. Physically, m phase windings are evenly distributed in the space of a pair of poles. FIG. 2 shows a six-phase system with six windings distributed in a complete region of two poles. The phases are labeled A, B, C, D, E, and F. The windings of the same phase in different pairs of poles can be put either in series or in parallel (not shown in the drawing), so the interconnection with the power source can be easier. FIG. 3 shows a block diagram of the control system for a multi-phase system. The system controller 111 provides system control function, and may outputs system parameters such as speed, torque, power delivered to the output etc. The output of this block is the references for the power electronics subsystem, which may include reference signals for frequency, voltages, and currents. 112 is the compensation block of the power converters. In one preferred embodiment, 112 deals with phase variables. In another preferred embodiment, block 112 is in a DQ synchronous frame so main control variables are in dc values in steady state. The phase voltages and currents in the power converter and the motor or generator are sensed when necessary. In a preferred embodiment, such variables are transferred into the αβ frame first through a coordinate transfer block 121 to get a general phasor presentation 124. Then through another coordinate transfer block 120 the feedback signal 124 may be transferred into the DQ frame to have a DQ presentation 125. These coordinate transfers are well known in the industry. After compensation in the DQ frame controller 112, control output 117, which may include voltage commands, are transferred into a αβ presentation 118 through coordinate transfer block 113. A modulation block 114 is used to generate PWM control signals from the phasor presentation. In one preferred embodiment, 114 uses space vector modulation. The PWM signals controls the power switches in the power converter 115, which powers the motor 116. When the number of phases is high in the system, space vector modulation may be very complex. In such a case, it may be easier to use a phasor control scheme in the modulation block 114, in which the variables in the αβ frame can be presented as a general phasor in the form of:

$$V = V_m e^{-j\theta},$$

in which V is the general voltage vector, $V_m$ is the amplitude of the vector, and $\theta$ is the angle of the vector.

From the amplitude information and angle information, the phase voltages can be easily determined from the ideal phase relationship of phases in a multi-phase system. For example, in an m-phase system, the ith phase's voltage can be calculated from the following relationship:

$$V_j = Vm\cos\left(\theta - \frac{(i-1)*360}{m}\right) + V_0,$$

in which $V_0$ is the zero-sequence component which can be set in the control system to optimize performance. Alternatively, instead of using zero-sequence component some 3rd and/or higher order harmonic components can be added to the above equation to obtain better performance.

Then PWM (pulse-width modulation) signal can be used to determine the duty cycles of the switches in each phase leg. The PWM switching signals are sent to the multi-phase power converter 115 to control the switches in the converter 115.

Figure 4:
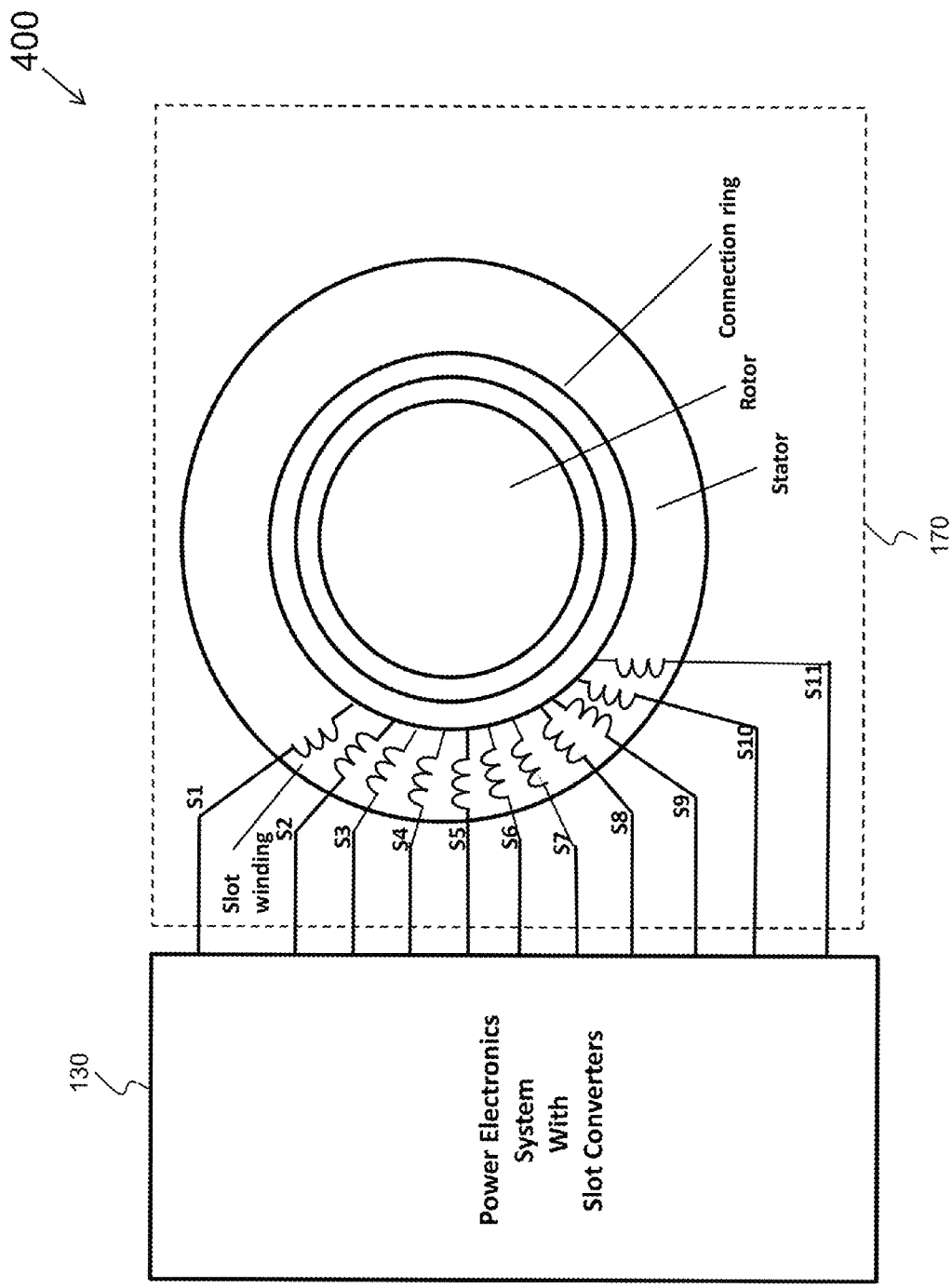
FIG. 4 illustrates a slot-based drive system with a slot-configurable motor and a slot converter based power electronics system in accordance with various embodiments of the present disclosure.

In a conventional multi-phase system, the number of phases is usually fixed. Though the number of poles may be reconfigured in a limited range by different connections of winding taps, such reconfiguration is usually static. Further improvements can be made to optimize the performance and cost tradeoffs. With an appropriate architecture of the power electronics system and an appropriate design of the electrical machine, in a preferred embodiment the number of phases and the number of poles can be dynamically reconfigured during operation. FIG. 4 shows an exemplary implementation. The reconfigurable motor 170 has many slots, labeled as S1, S2, and so on along the stator armature (but only a portion is shown in details in the figure for the sake of clearness). In each slot, there is a one-turn slot winding. The conductor in a slot may consist of one of multiple wires, or can be a solid piece of conductor, such as an Aluminum or Copper bar. The winding can be inserted into the slot, or casted or molded into the slot. Also, the conductors in adjacent slots can be put in parallel, and in such case the paralleled windings are treated as one winding in control and power perspective. At one end of the stator, all slot windings are connected to a connection ring, which basically shorts all slot windings on one end to form an equivalent star connection. The connection ring may be grounded by making one or more electrically conductive contacts to the metal case of the stator or other grounded structure. The other end of each slot winding is connected to a slot power converter of a power electronics system 105, which is basically a single-phase inverter or rectifier. Depending on the system requirement, a slot power converter can perform inverter functions, rectifier functions, or both. Because in this architecture, a slot winding is not committed to any particular pole or phase, the phases and poles of the machine can be dynamically reconfigured by controlling the phase relationship of the currents and voltages between the slot windings. By changing the phase relationship between the winding currents and voltages, different poles and phases can be established, and both the number of phases and the number of poles can be dynamically controlled. Therefore, a dynamically reconfigurable machine 170 with this embodiment structure can be called a universal motor (or generator), and a slot-based powering architecture should be used to fully employ the flexibility of such a machine.

Figure 5A:
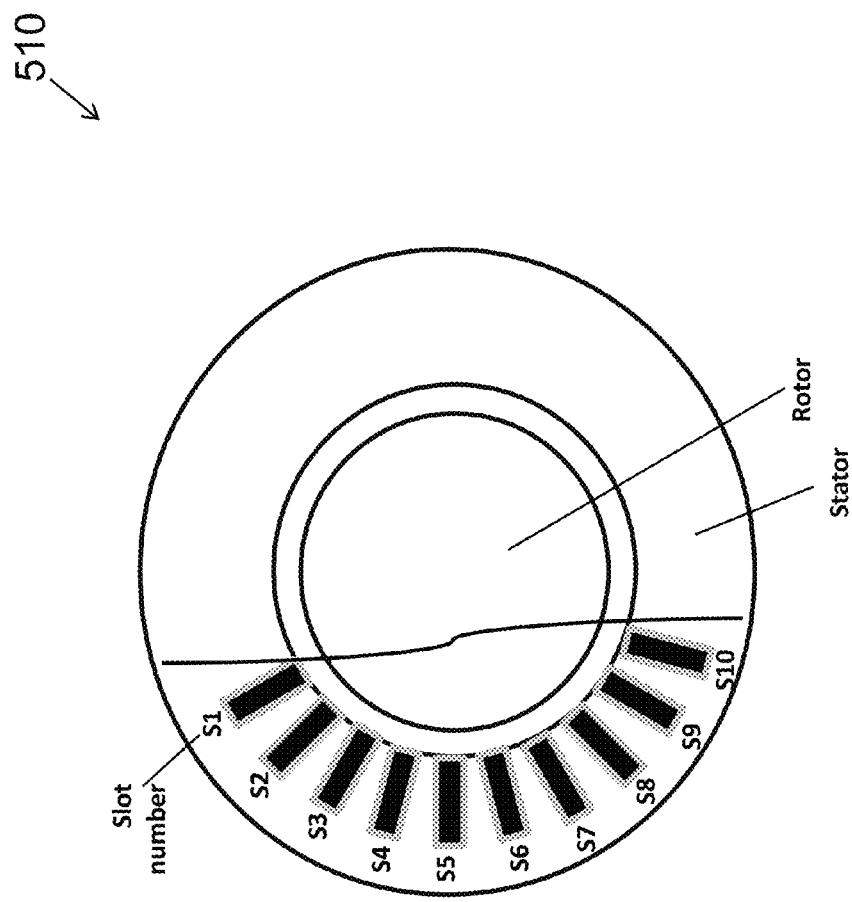
FIG. 5A illustrates a connection end of a stator of a slot-configurable motor in accordance with various embodiments of the present disclosure.
Figure 5B:
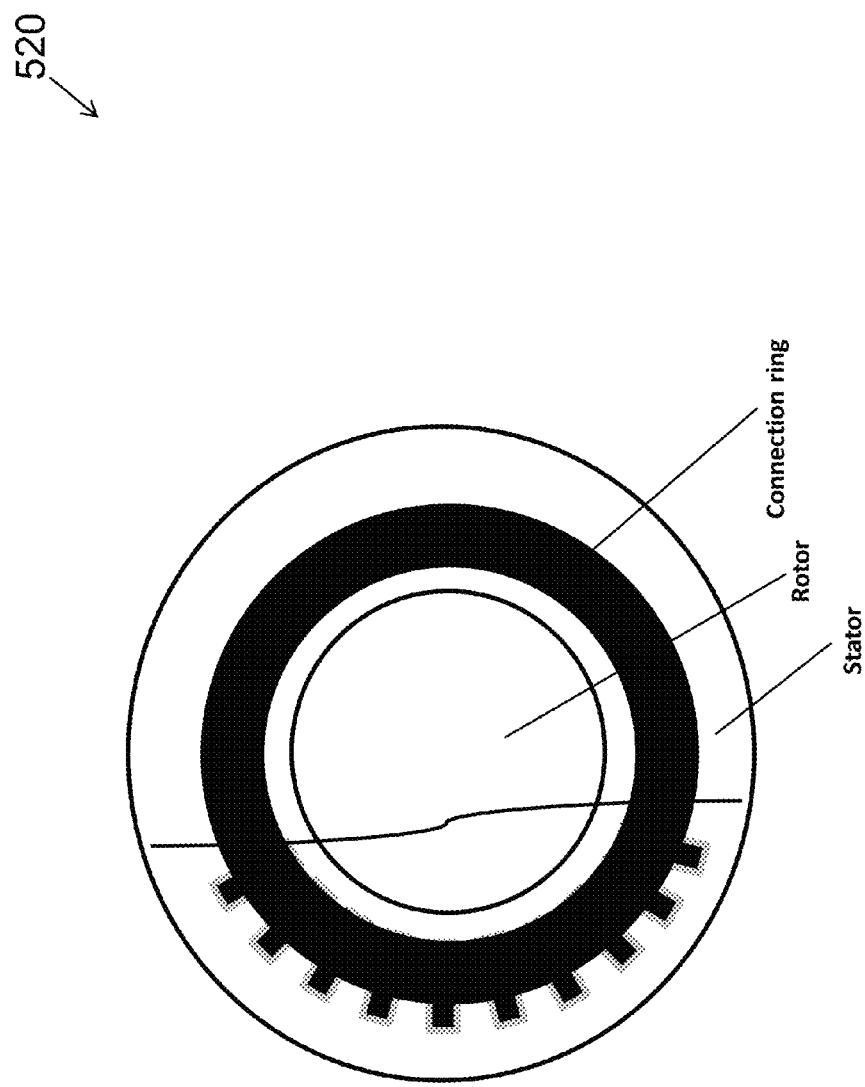
FIG. 5B illustrates a shorted end of a stator of a slot-configurable motor in accordance with various embodiments of the present disclosure.

FIG. 5A shows the connection end of the stator, where the slot windings are separated. FIG. 5B shows the shorted end of the stator, where a connection ring connects all slot windings together. A rotor is magnetically coupled to the rotor, and has rotor windings. The details of the rotor windings are not shown for simplicity. In a preferred embodiment, a squirrel cage rotor winding is used, so the phases and poles in the rotor can be automatically adapted to any stator configuration.

The following example shows the operation of adjusting phase and pole dynamically according to this disclosure. A motor with 60 slots in its stator may be configured to have 40 poles initially, and then each pair of poles has 3 slot windings. So initially it's a three-phase system, and the phase shift from a slot winding to an adjacent slot winding is 120° electrically. When according to the system requirement the motor is configured to have 10 poles, each pair of poles now has 12 slot windings. The 12 slot windings in a pair of poles can be configured as a 12-phase system with the slot phase shift being 30°, or as a 6-phase system with every pair of two adjacent slot windings working as one phase winding and with a phase shift of 60° between adjacent phase windings, or as a 4-phase or even 3-phase system. However, when more than one slot wings are assigned to one phase, there will be circulating current between the slot windings, and the efficiency and power capability is reduced. If a phase has only one slot winding, the motor's efficiency and power capability are kept at the highest. Moreover, different pairs of poles may have different numbers of phases. For example, in the above 60-slot motor, a 36-pole configuration can be achieved by having 6 pairs of poles have 4 phases (in 4 slots) in each pair, and 12 pairs of poles have 3 phases (in 3 slots) in each pair. With this uneven phase configuration, the pole number of the 60-slot example motor can be any even number from 2 to 40, so the synchronous speed at a given frequency can have a range of 20:1. In this way, the pole number is controlled to change in substantially fine steps, and there are a significant large number of steps (for example the maximum pole number is higher than ½ of slot number, and the minimum pole number may be 2 or 4). The power rating of the motor and associated power electronics system can be kept constant over the whole range.

Pole number control can be a significant part of a variable-speed control system. With the fine-step change of number of poles, the speed of a motor or generator can change over a wide range while the frequency of winding currents being in a narrow range, to optimize the system performances. In some applications which don't need precise speed regulation, the frequency of a power supply to a winding (thus the current in the winding) may be kept constant and speed control can be achieved with the change of pole numbers alone. This can result in better design of the power converter, especially in very high power applications where frequency change may be difficult or inefficient, for example in resonant topologies. In addition, because the control of pole number change is equivalent to a mechanical gear in changing the speed, mechanical gear boxes in a drive system can be eliminated, achieving better system efficiency, cost, size, and weight.

Because each slot of the universal motor may has only one winding with modest voltage rating, the insulation requirements of the machine and associated cabling are minimized. In addition, a low-cost manufacturing process similar to those used with the squirrel cage rotor in induction motors can be applied to the stator also. As a result, better performance and more power can be obtained in a machine with less cost, weight and volume. This makes the universal motors a good choice for challenging applications such as in electrical drives in vehicles, aircrafts, ships, and other industrial applications. And a universal generator with this technology is also suitable in wind power generation and other outdoor energy applications.

Figure 6:
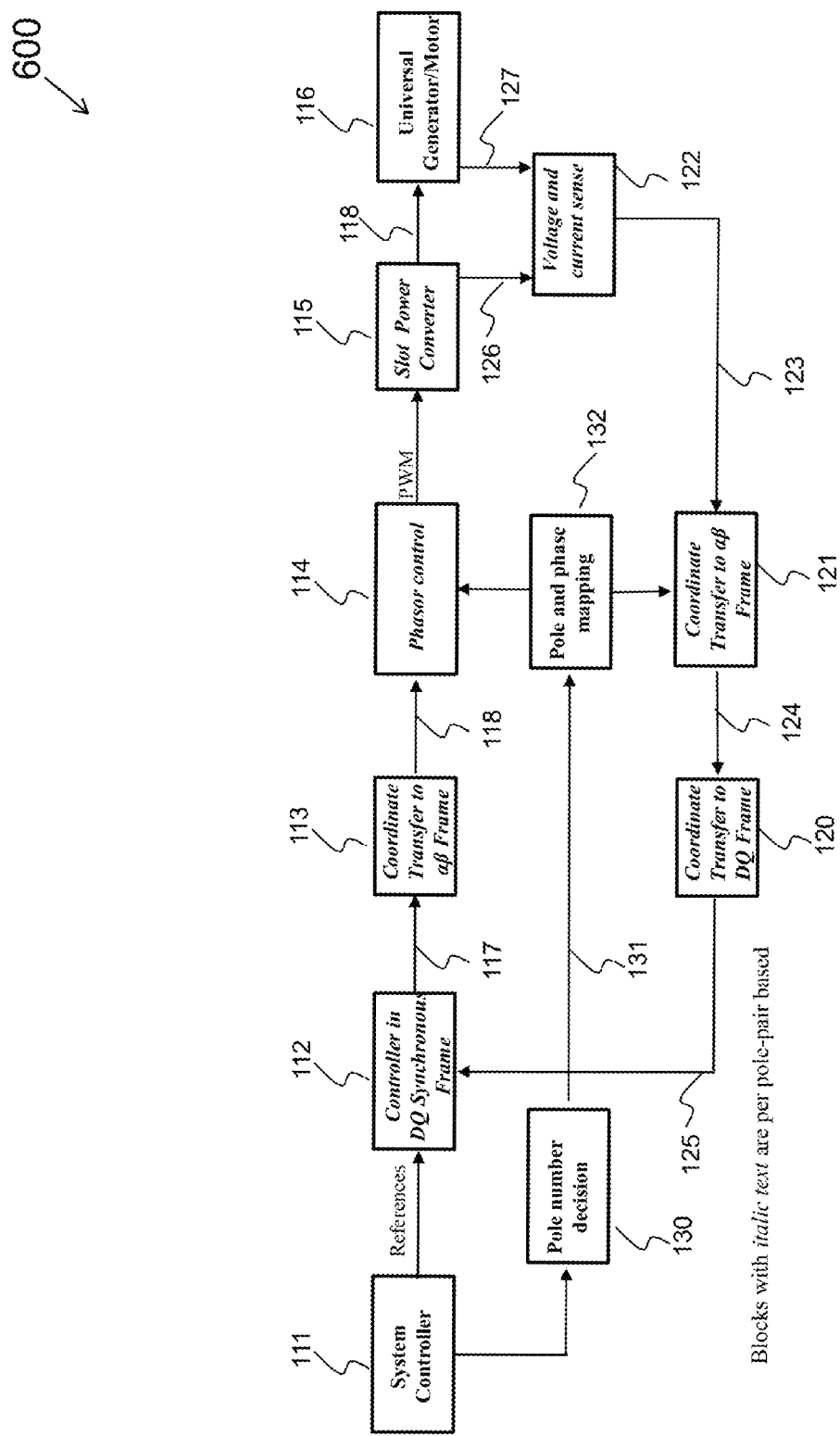
FIG. 6 illustrates a control system for a slot-based drive system shown in FIG. 4 in accordance with various embodiments of the present disclosure.

A control block diagram is shown in FIG. 6 for a universal motor with slot power converters. The general signal flow is similar to the method shown in FIG. 3, but a few blocks are added and changed. The selection of number of poles, through the pole number decision block 130, now plays an important role, and should be made considering the speed, power and frequency information. In one preferred embodiment, 130 is a separate block. In another preferred embodiment, the function of the block 130 may be part of the system controller. A pole and phase mapping block 132 may have a mapping table to decide slot assignment, and should be updated whenever there is a pole number or phase number change, so the slots are dynamically assigned to poles and phases. To explain the operation with the above 60-slot motor example, Slot S4 may be assigned initially to Pole Pair P2 as Phase A in the original 40-pole three-phase configuration. To move to a 36-pole configuration, a new assignment should be made. As discussed earlier, in a 36-pole configuration 6 pairs of poles may have 4 phases each, and 12 pairs of poles may have 3 phases each. Now pole pair P1 may have 4 phases, so slot S4 may be assigned to pole pair P1 as Phase D. The coordinate transfers between the $\alpha\beta$ frame and phase variables should use the information in the mapping table and be performed individually for each pair of poles, using pair of poles as a basic subsystem. Now the windings in each pair of poles should be collectively treated as a subsystem in a pole control module, and control functions related (especially the winding current control) all phase windings in a given pair of poles should be processed in the corresponding pole control module. The blocks in a pole control module are denoted with italic text in FIG. 6. Therefore, for a configuration with P pairs of poles, there will be P pole control modules, and all pole control modules should be processed in synch. Each pole control module can be treated as a thread in control software programs, and the whole control system now becomes a multi-thread process. It will require more computational resources than a conventional control system as is shown in FIG. 3. However, with the rapid progress of computer processing capability, the added resource requirement is not a significant burden, and is well justified considering the advantages the dynamic pole and phase configuration can bring to the system. In this way, the number of poles, number of phases in each pair of poles, and the frequency of windings currents can all be controlled simultaneously in a well-coordinated way to achieve smooth system operation.

Every slot winding of the universal motor or generator should be powered by a slot power converter 115. The slot power converter should be able to control its current and voltage under any condition. Considering the dynamic change of phase and pole association a slot winding can have, it's best that the voltage and current control be self-contained to the slot power converter. Therefore, instead of using space vector modulation which coordinates the control of all phases in a system, it's better to use the phasor control scheme discussed above with FIG. 3. To accomplish self-contained control, the zero-sequence component in phase voltage or current calculation should be set to zero, and if needed some $3^{rd}$ and/or higher order harmonic components can be added to increase the power capability and other performance.

Figure 7A:
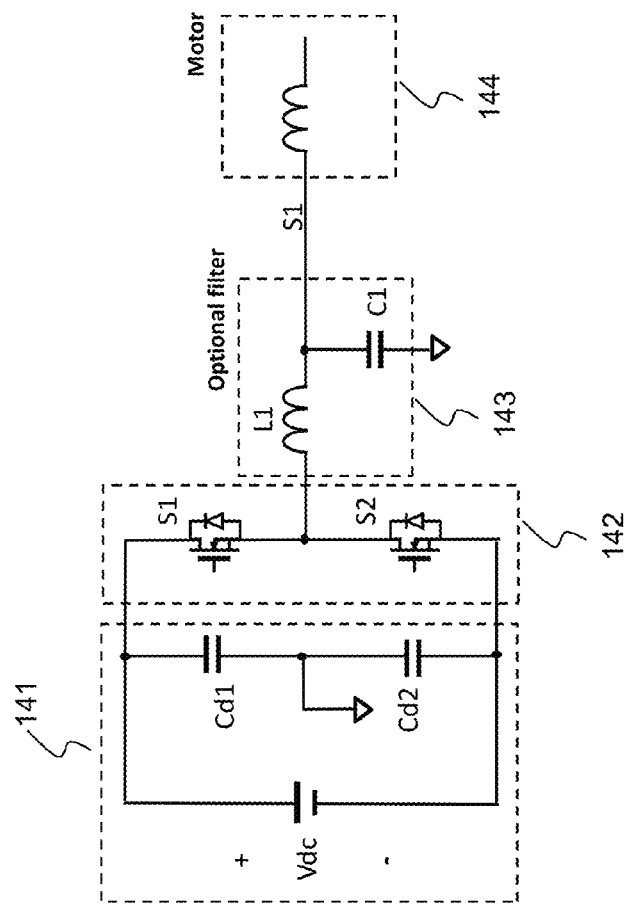
FIG. 7A illustrates a two-level slot power converter in accordance with various embodiments of the present disclosure.
Figure 7B:
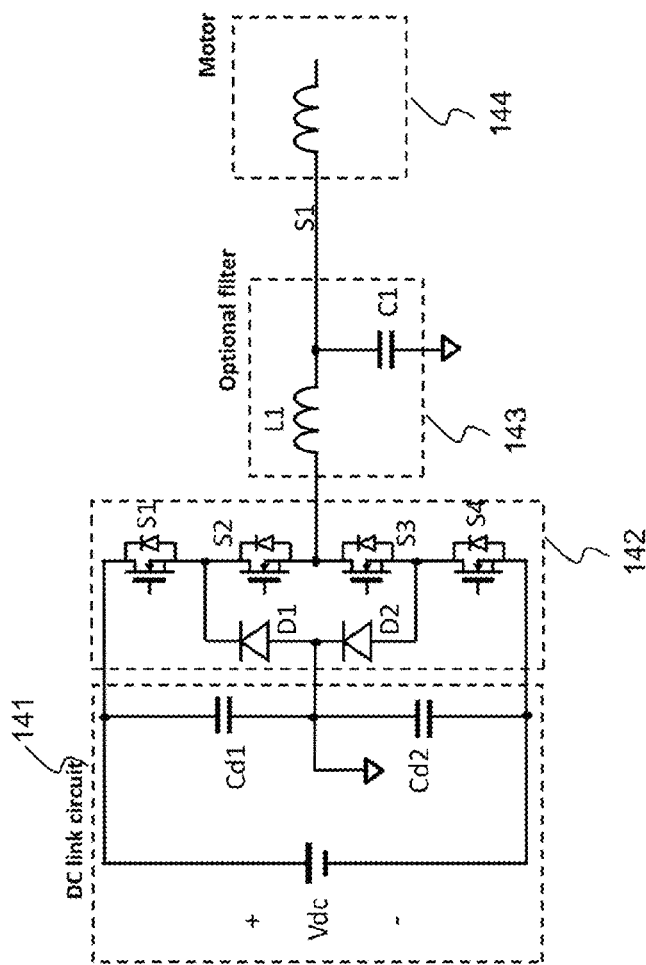
FIG. 7B illustrates a three-level slot power converter in accordance with various embodiments of the present disclosure.

FIGS. 7A and 7B shows two inverter topologies suitable for the slot power converter. FIG. 7A is a two-level converter, and FIG. 7B is a three-level converter. If high power is needed, multiple converters with these topologies can be paralleled (preferably interleaved in control), or higher-level topologies can be used. The operation principles of these topologies are well known, and do not need to be discussed here. The optional filter 143 consisting of inductor L1 and capacitor C1 can be used to reduce the current ripple and dv/dt supplied to the slot winding, so EMI can be reduced. Other filter configuration can also be used. The dc-link circuit uses one input power source Vin. If needed two input sources can also be used, with one across each of the input capacitors Cd1 and Cd2. Part or all of the dc-link circuit 141, consisting of the input source, input capacitors and possibly other filter circuit, can be shared by multiple slot converters or all slot converters in a system, to reduce the cost and complexity of the power system.

Figure 8:
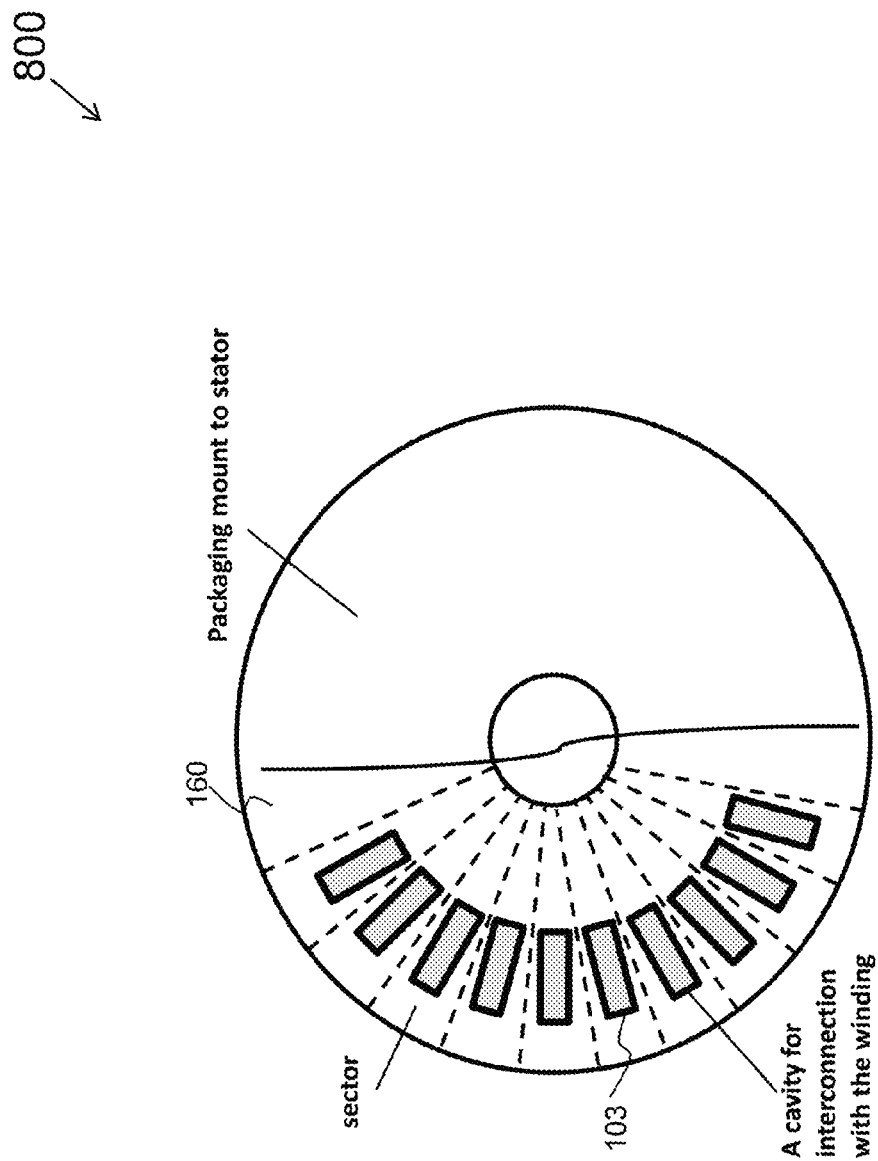
FIG. 8 illustrates an embodiment of a packaging technique in accordance with various embodiments of the present disclosure.

Due to the existence of many slots and slot converters, it's possible to optimize system performance by disabling some of the slots and their associated slot converters in certain conditions. For example, in light-load conditions, some slots can be powered off by de-activating the power converters (disabling the switching of power switches in the converters) to reduce power losses and improve efficiency. The disabled slots and de-activated converters can be used as a backup system for the active slots and converters, so the reliability and availability of the system can be improved. In some applications the large number of interconnections between the motor (generator) and the slot converters may present an issue. FIG. 8 shows a conceptual drawing of a packaging technique to alleviate the issue by minimizing the length of the interconnections. Part or all components of the slot converters are assembled on to a substrate 160, to become an assembled package. In one embodiment, the substrate 160 is as a printed circuit board (PCB). The substrate 160 is designed to have a suitable shape and size to reduce interference with the motor or generator operation, and is divided into many sectors, so each sector can be easily coupled to one or more slot windings through suitable connection means. The substrate may have cavities to allow the connection terminals of the slot windings to protrude through. The connection terminals of the slot windings may be processed and shaped for easier connection. The package is coupled mechanically to the stator by connecting the connection ends of the slot windings of the motor through the cavities of the substrate 160. The connection terminals of the slot windings may be connected to intermediate connectors, which are connected to the substrate. The associated slot converters are packaged in or near the sector. The package may have several subassemblies, with each subassembly housing one or more slot converters. The circuits in the package may be cooled by one or more fans coupled to the rotor of the motor (generator), or cooled through other means.

Figure 9:
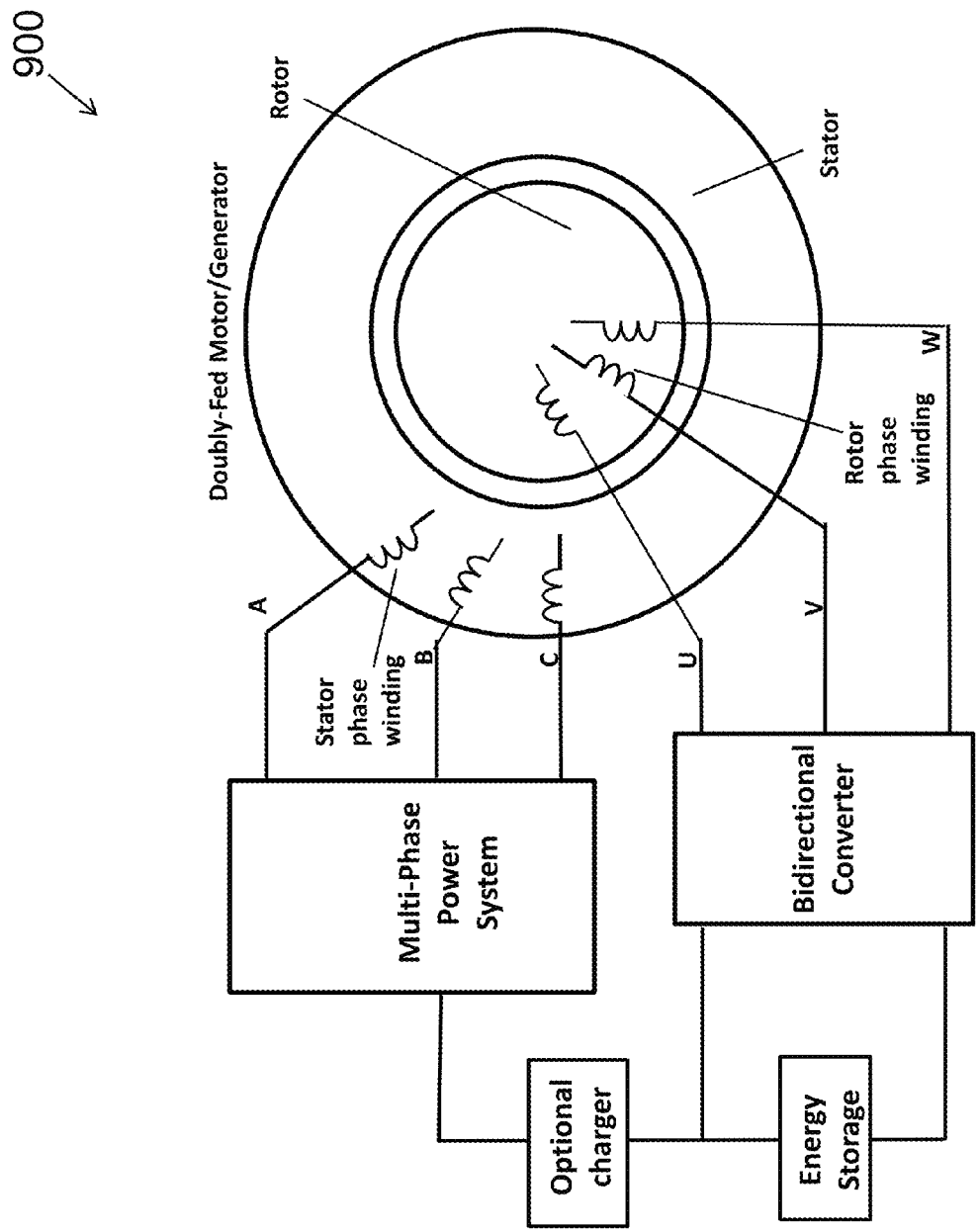
FIG. 9 illustrates a double-fed drive and generation system in accordance with various embodiments of the present disclosure.

The above described techniques can be used in both induction motor and induction generator. For example, in doubly-fed generators found in many applications, the number of phase may be decided by the system to which the stator windings are connected to, but the number of poles may be changed dynamically by electronic switches to reconfigure winding connections in both rotor and stator. The switches for the rotor and their control circuit may be coupled to the rotor mechanically. Moreover, it may be desired to have energy storage in a power generator such as in wind power applications, so the power delivered to the system will be more consistent and have less fluctuation with lower peaks. Traditionally, the energy storage is coupled to the system through dedicated power processing equipment, which results in additional costs. It is desirable to integrate the energy storage with the generator system to reduce system cost. FIG. 9 shows a block diagram of a system with energy storage coupled to the rotor windings in a multi-phase system (three phases are shown as an example). There may be an optional charger coupled between the system and the energy storage, but its power rating would be much smaller than in a stand-alone energy storage system. By controlling the currents and voltages of the rotor windings, the position, strength, and rotation speed of the magnetic field generated by the rotor can be controlled, so the power flow between the energy storage, the system, and wind source can be controlled. The poles may be configured dynamically to change the synchronous speed to optimize system performance over a wide speed range a wind turbine is required to operate. When the wind is strong, more power can be obtained from the wind, and the rotor runs at a speed higher than the synchronous speed of the stator field. The rotor should be controlled to generate a field rotating in the opposite direction of the stator field, with the speed equal to the difference between the rotor's mechanical speed and the stator field's synchronous speed. In this way, part of the wind power is sent to the power system electrically coupled to the stator windings, and part of the wind power is send to the energy storage (usually batteries) coupled to the rotor windings. When the wind power is moderate, the rotor should be controlled to rotate at or slightly below the synchronous speed of the stator field, so the wind power is delivered to the system through the stator. Some power may be also drawn from the energy storage, and from the optional charger connected to the energy storage if necessary. When the wind power is low, the rotor speed may be significantly lower than the synchronous speed of the stator field. The wind power is delivered to the power system electrically coupled the stator, and significant power is drawn from the energy storage, and from the optional charger if necessary, through the rotor windings and delivered to the stator windings. In this mode, as long as more power is drawn from the wind than lost in the system, there is positive energy gain. This allows the wind power generator to harvest more energy than possible without energy storage. The control of pole numbers (and thus the synchronous speed of the magnetic field generated by the stator winding currents) allows the rotor windings and their associated power converter to operate over a smaller frequency range than otherwise would be required. When the wind is too low to be utilized, energy from the storage can still be transferred to the stator when the rotor is stalled by proper control of the rotor winding currents.

This concept can also be used for other doubly-fed power generators with variable speed, such as backup diesel generators or gas turbines together with battery energy storage, with their performance being optimized in a wide speed range, by variable number of poles and optimized use of energy storage.

Figure 10:
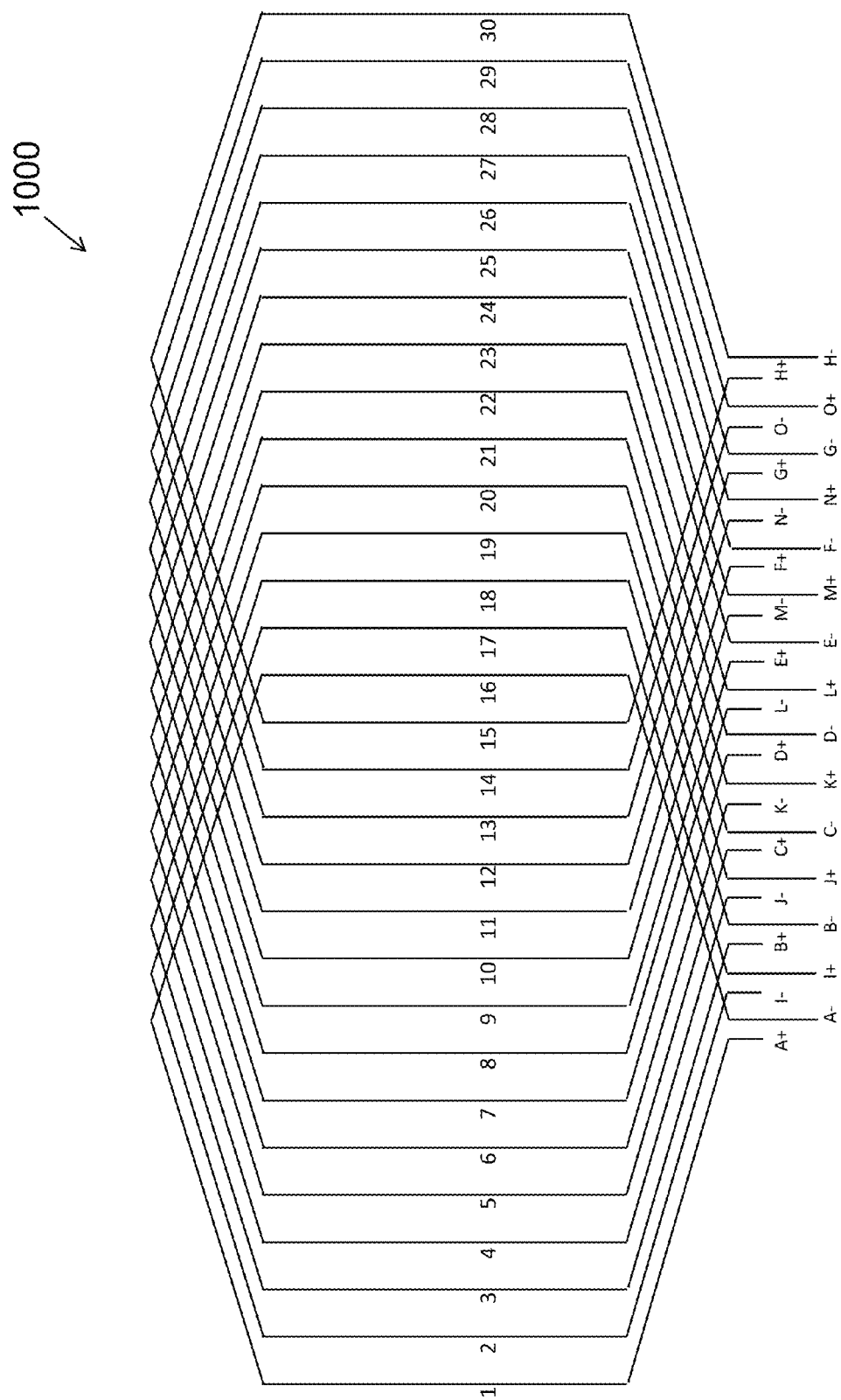
FIG. 10 illustrates a winding diagram of a 15-phase 2-pole configuration of a motor in accordance with various embodiments of the present disclosure.
Figure 11:
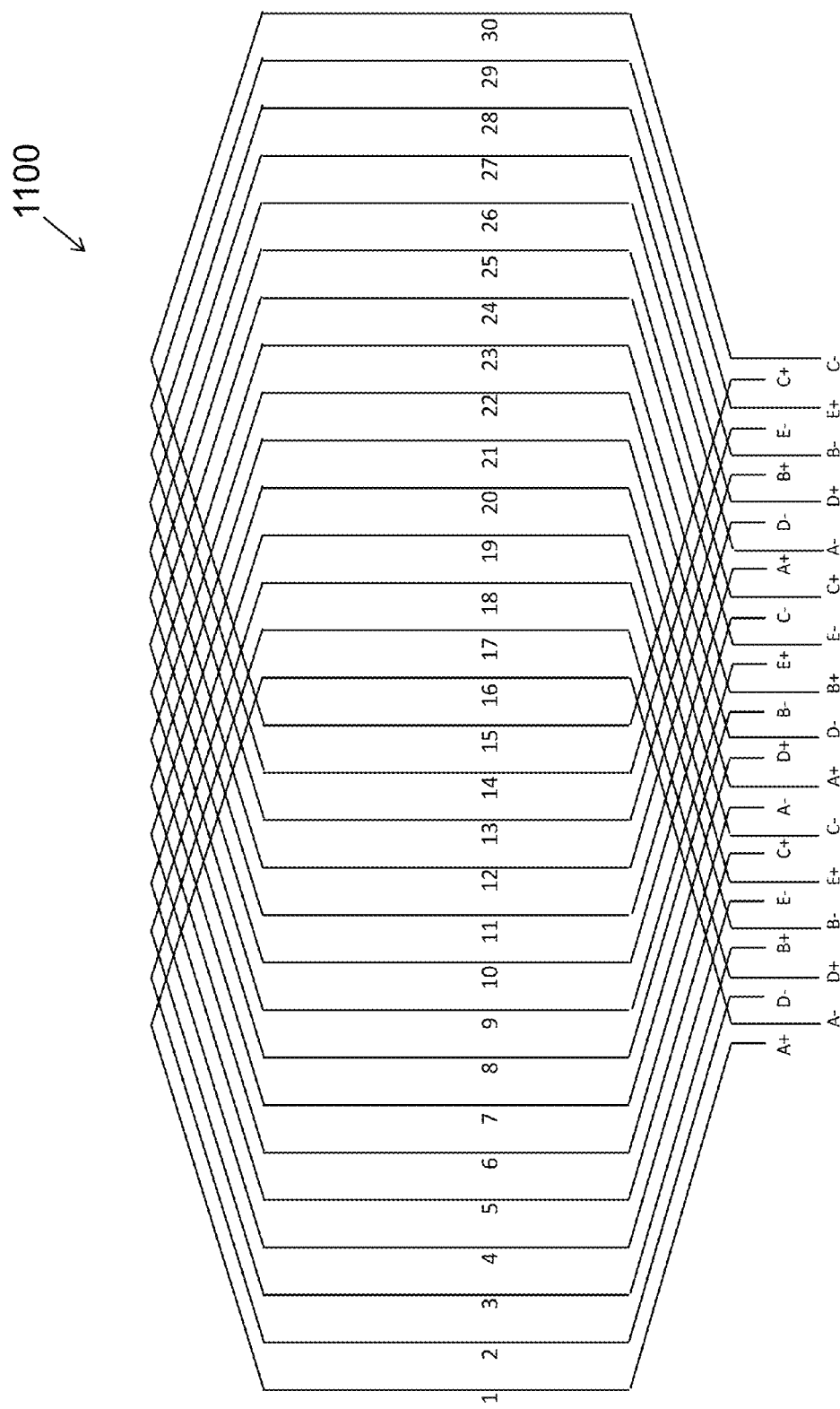
FIG. 11 illustrates a winding diagram of a 5-phase 6-pole configuration of a motor in accordance with various embodiments of the present disclosure.
Figure 12:
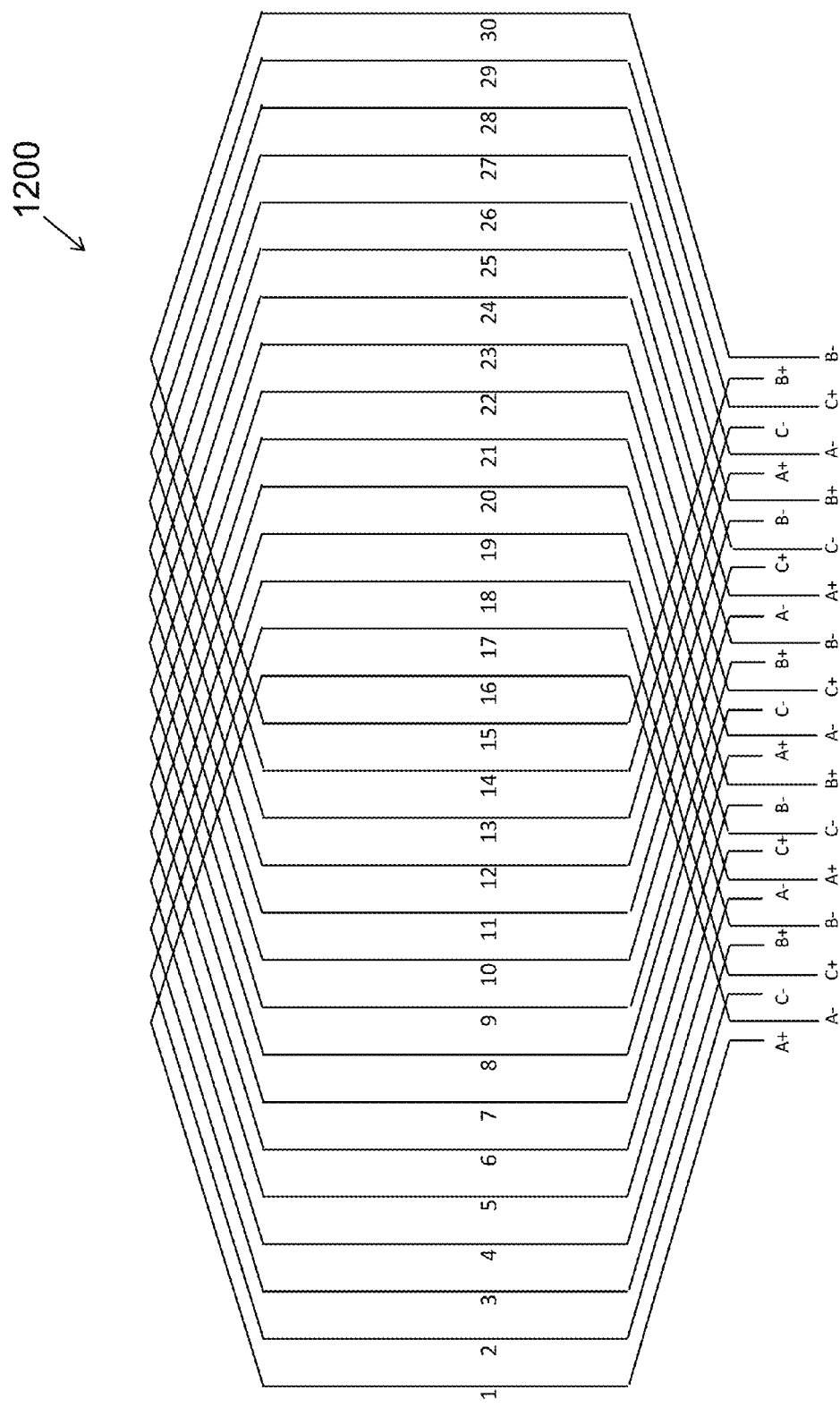
FIG. 12 illustrates a winding diagram of a 3-phase 10-pole configuration of a motor in accordance with various embodiments of the present disclosure.

With the above described techniques, a motor can be dynamically reconfigured to have a big set of numbers of poles. One potential limitation is that each winding has only one turn which may not be able to generate a high voltage, and the number of converters needed to power the motor is the same as the number of slots. As a result, many windings with low voltages and converters are needed. For some applications this limitation may result in an awkward design, and a different way to arrange the windings and the converters may be desired. In some applications, a limited set of pole numbers may be able to provide acceptable system performance. In such cases the motor can be designed to have a smaller number of windings but each winding can produce a higher voltage to achieve better results. Let's use the configuration with lowest pole number needed (with P0 being the number of poles) as the base configuration. With proper system design, the allowed number of poles can be limited to be odd multiplier of the lowest pole number, i.e. Pi=Ki*P0, where Pi is an allowed number of poles, and Ki is an odd integer, with i being an integer as the index for the set of pole numbers. Therefore, any two slots which are 180° electrical angle apart in the base configuration are 180° apart in all allowed configurations. So, conductors in these two slots can be put in series to form a winding, and multiple turns can be easily achieved in this winding. We can arrange each winding in the base configuration to have a plurality of turns placed in two slots which are 180° electrical angle apart (these two slots should be the closet pair if multiple slots are 180° electrical angle apart from one slot), and each winding is powered by a power converter. The minimum number of slots will be the least common multiple of all the allowed numbers of poles, or three times the maximum pole number allowed (considering at least three phases are needed in each pair of poles in normal operation, in order to get good performance), whichever is bigger. In this way, multi-turn windings can be used to optimize a motor design, and the maximum number of converters needed is reduced to half the slot number. By controlling the currents/voltages in the windings the number of poles and number of phases of the motor can still be dynamically reconfigured during real-time operation. An example will be explained in the following with a motor which can be configured to have 2 poles, 6 poles and 10 poles. In this case, a 30-slots stator can be used. Fifteen windings can be placed in the slots with each winding in two slots. Each winding is physically coupled to a power converter, which can have different topologies, such as half-bridge, full-bridge, multi-level, etc. FIG. 10 shows a winding arrangement for a 2-pole configuration. FIG. 11 shows a winding arrangement for a 6-pole configuration, while FIG. 12 shows a winding arrangement for a 10-pole configuration. In these drawings, the numbers are slot numbers and represent the slots in the stator with the value represents the relative position of the slots on the stator armature. An alphabetic letter represents the phase assignment for a winding. For example, A+ designates the start of Phase A winding, and B− designates the end of Phase B winding. A one-turn winding is shown in each slot pair, but multi-turn windings can also be formed easily within the slot pair. In FIG. 10, the winding in slot 2 and slot 17 is assigned to Phase I, and it starts from slot 17 and ends at slot 2. In the configurations shown in FIG. 11, the same winding is assigned to Phase D, while it is assigned to Phase C in FIG. 12. That is, in different winding configurations, the phase assignment of a winding may change, but a winding is always powered by the same power converter, so the phase relationship between different windings within each pair of poles can be controlled by the currents in the windings. Between different pairs of poles, the phase relationship of the same phase should be decided by the control algorithm. Field-oriented control can be used to control the flux position for each pair of poles.

Other sets of poles can also be designed similarly. For example, the stator of a motor capable of operating in 2-pole, 6-pole and 14-pole modes can be similarly designed with 42 slots and 21 windings, and the stator of a motor capable of operating in 2-pole, 6-pole, 14-pole and 18-pole can easily be designed with 126 slots and 63 windings.

In dynamically reconfigurable motors, it's better to design the number of slot in the rotor to be the same as or close to the number of slots in the stator, so the induced currents and voltages in the rotor windings can keep up with any change in the phase and pole configuration in the stator windings relatively easily. Because a high number of converters and phases are usually used to power the stator windings, some power converters can be de-activated or put into standby mode, so no current flows in the windings coupled to them. This will increase system efficiency during light load, and also keep the system in operation when some windings or some converters are failed. When any converter is de-activated, the control should be adjusted accordingly to consider the number of phases, and number of poles change if any, so the system performance will not degrade significantly. Please note that the mechanical speed of the rotating magnetic field generated by the currents of the windings assigned to any pair of poles should be the same in steady-state operation. In any operation mode, if number of the active slots assigned to a pair of poles is different from that of the active slots assigned to another pair of poles, the frequency of the currents and voltages in a pair of poles may have to be adjusted to compensate the airgap length difference in this pair of poles.

The above discussed technology applies mostly to dynamically reconfigurable induction machines (or motor) (DRIM) where a rotor can automatically adjust to the changes of number of poles and number of phases automatically. In principle, this is to divide the airgap or stator armature perimeter into different number of poles circumferentially according to the operation condition in a dynamic fashion. Each pair of poles has several stator slots occupied with stator windings. As is well known in the industry, a stator winding current in an induction machine has two components: a magnetizing component (magnetizing current) and a torque component (torque current). Assuming that in the ith pair of poles of a machine, $M_i$ stator slots are evenly distributed spatially, and stator windings are housed in these slots, and the magnetizing currents in these windings have evenly distributed phase angles and a local frequency of $f_i$, then the moving magnetic field generated in the airgap under the pair of poles by these magnetizing currents has a synchronous speed of:

$$S_{si} = 60 * f_i * M_i / M_s \text{ (RPM, revolutions per minute)},$$

where n is the number of slots in the stator, and the slots are evenly distributed along the armature perimeter of the stator.

It is important to make sure the synchronous speed in each pair of poles within a motor is equal or very close, so a rotating magnetic field is generated in the whole air gap collectively by all pairs of poles in the machine, facilitating a smooth torque to be generated in the rotor. That is, $S_{si} = S_s$, where $S_s$ is the machine's synchronous speed. From the above equation, it is clear that the local frequency of stator winding currents within a pair of poles has a reciprocal relationship with the number of stator slots in the pair of poles. The frequency of magnetizing currents in a pair of poles is different from that in a different pair of poles, if the numbers of phase windings in the two pairs of poles. In each stator winding, the rotating magnetic field will also generate an induced voltage at a synchronous frequency, which is equal to Ss*P/60, with P denoting the number of pole pairs. In steady state operation, the torque current in a stator winding has the same frequency as the induced voltage, and thus is at the synchronous frequency, in order for a steady torque to be generated by the rotor.

If the pole number of a motor is changed during an operation mode, it is better to change the magnetizing current frequency and the torque current frequency in every affected pair of poles according to the number of slots in the pair of poles, so that the synchronous speed of the rotating magnetic field remains approximately the same before and after the pole number change, to facilitate a smooth transient in the motor's operation.

If during an operation mode of a DCIM, some pair of poles have different number of slots from another pair of poles, then the synchronous frequency is different from the local frequency in some or all pairs of poles. Under this situation, the voltages and currents in some windings will both have components in two frequencies, as the magnetizing current will generate a voltage in a winding due to its resistance and leakage inductance. Within a pair of poles, the phase angles of the magnetizing currents in all stator windings should be evenly distributed and can be represented by a magnetizing current phasor at the local frequency, and the phase angles of the torque currents in all stator windings should also be evenly distributed, and can be represented by a torque current phasor at the synchronous frequency. If in a pair of poles the local frequency and the synchronous frequency are equal, the magnetizing current phasor and the torque current phasor may be combined into a phase current phasor, and modeling and control of the winding currents can follow a similar methodology as in a standard induction machine. However, if these two frequencies are different, then the magnetizing current phasor and the torque current phasor need to be treated separately. This requires important changes in coordination transfers as will discussed later. Of course, it is also feasible to identify a limit set of pole numbers with equal stator slots in every pair of poles, and operate a DRIM machine within such a set of pole numbers so only, so that the synchronous speed is always equal to the local speed in every pair of poles. For example, a motor with 42 stator slots can operate with 14, 7, 6, 3, or 2 pairs of poles with equal slots in every pair of poles. During this kind of operation, the control and modelling of the DCIM motor with each number of poles can follow a similar methodology of regular multiphase induction motors.

A machine's torque and magnetic field in an induction machine can be controlled in a synchronous D-Q frame which rotates at the synchronous speed. When setting up the D-Q frame for a DRIM machine where a local frequency is different from the synchronous frequency within a pair of poles, D-axis currents should represent only torque components of stator winding currents, while Q-axis currents should represent only magnetizing components of stator winding currents (which correspond to the air gap magnetic field). In this way, it will be easier to control the torque and magnetic field in a coordinated way. For example, the demanded torque is significantly below its maximum rating during most time of a motor's operation, such as when an electric vehicle is cruising at an almost constant speed. In such an operation mode, the torque current and the magnetic field strength can be set at the right levels, so that the total power loss in the motor, or in the total drive system is minimized. There is a control freedom in this process as the torque generated by the windings in a pair of pole is basically proportional to the flux linkage and the torque current within the pair of poles, so for the same torque there is freedom in choosing the flux linkage and torque current, which leads to a possibility of optimal design tradeoff. In a motor, the power losses in the windings are determined mainly by the currents in the windings and the resistance of each winding, which is a function of the frequency/frequencies of the current and the temperature of the winding. The power losses caused by the magnetic field, including the eddy current loss in the magnetic material (such as silicon steel sheets) and metal in a motor, is a function of synchronous frequency, the strength of the magnetic field, and effective area of the magnetic path under a pair of poles. Therefore, it is possible to set the number of poles, which in turn determine the synchronous frequency for a given speed, the number of active phases (windings) in a pair of poles, and magnetic field strength for a given rotor speed and torque requirements, so that the total power loss in the power train, including power converters, motors, and other key components if any, to be minimized for a given mode of operation (i.e. rotor speed and torque). This may require some power converters and windings be deactivated during some operation, and also field-weakening for a wide range of operations, not just at a high speed range as in a normal system. Please note that the elimination or simplification of mechanical gears in a DRIM motor leads to a way to operate the motor at a lower frequency during most of its operation mode, which further reduces the power loss in the motor, and possibly in the power converters when their switching frequency is adjusted accordingly. To consider the complex factors affecting the efficiency of a drive system, an efficiency model of the system under various operation modes may be developed and used to determine the optimum values for number of poles, synchronous frequency, number of active phases in a pair of poles, magnetic field strength and/or torque currents etc to reach an optimal or close to optimal system efficiency for a wide range of operations. This can significantly improve system energy efficiency, and thus can lead to much better battery life and miles per charge for vehicular applications including electric vehicles and hybrid electrical vehicles.

Moreover, completely decoupling the torque current and the magnetizing current in D-Q frame allows easy coordination frame transfers between the synchronous D-Q frame and a stationary frame even if the local frequency and the synchronous frequency are not equal in a pair of poles. From a machine-level D-Q control variable (such as a current reference), a corresponding control variable in the D-Q frame for each pair of poles can be obtained by considering the number of slots (or active slots) in the pair of poles and the number of poles in the motor, so each stator winding have equal or similar current and voltage, in order to get better performance and avoid over stress in any winding. In a preferable embodiment, the stator winding current control in a pair of pole can be performed in the synchronous D-Q frame. This can be accomplished by coordinated control among power converters associated to the pair of poles. In another preferred embodiment, the stator winding current control can be done at the converter level after transforming current references in D-Q frame into stationary phasor variables. Either way, the frame transfers between the synchronous D-Q frame and a stationary frames are required. The frame transfers between a Q-axis current and magnetizing currents shall be at the local frequency for the given pair of poles, while the frame transfer between a D-axis current and torque currents shall be at the synchronous frequency. When transferring imbalanced winding currents in a stationary frame to the D-Q frame, the D-Q components may have components at a beat frequency which is the difference between the synchronous frequency and the synchronous frequency, and at the sum frequency which is the sum of the synchronous frequency and the synchronous frequency, in additional to a dc component which is the value needed from the transfer. Therefore, proper filtering may be needed in the control system to filter out the beat frequency and the sum frequency components. With modern filters, especially digital filters, such a filtering task is possible. Especially, since the frequencies are known to the control system, such information can be used in the filter design to improve the performance of the filter. Also, the frequency ranges in a DRIM drive can be made narrower and extreme frequencies can be avoided with the help of pole number changes, which also facilitate the filter design.

In a good design, it is important to eliminate or reduce the disturbance in the current and voltage of a rotor winding when it passes different pairs of poles of the stator as the rotor rotates. This requires that at or around the boundary of two adjacent pairs of poles, the moving magnetic field's flux density in the airgap are equal or very close under the two pairs of poles all the time. To achieve this goal, the magnetizing currents of in the stator windings under each pair of poles should be controlled properly to create a smooth rotating magnetic field in the airgap of the machine. A good practice is to control the stator winding currents associated with a pair of poles such that the moving magnetic field has a substantially sinusoidal distribution circumferentially within the pair of poles, with the amplitude the same in every pair of poles, and the initial phase angle zero at the boundaries. This can be done by proper control of the amplitude and the phase angle of magnetizing currents in the stator windings. If a pair of poles has any slot de-activated, then the moving magnetic field in this pair of poles will have a negative sequence component in addition to the normal positive sequence component. A good practice in this situation is to make the positive sequence component synchronous to the moving magnetic fields under other pairs of poles in the same machine, through proper control of the amplitude and phase angle of currents in the active windings. In case only two active windings are left in a pair of poles, the phase difference between the currents in these windings may be 180° or 90°. In such a way, the moving magnetic fields under all pairs of poles in the DCIM motor are all in synch, and the windings in the rotor operate in the same way as in a regular multiphase induction machine in steady state. Therefore, the rotor in a DCIM motor can be designed similarly to that in a regular multiphase induction motor, and regular squirrel cage rotors can be used in DCIM machines.

Figure 13:
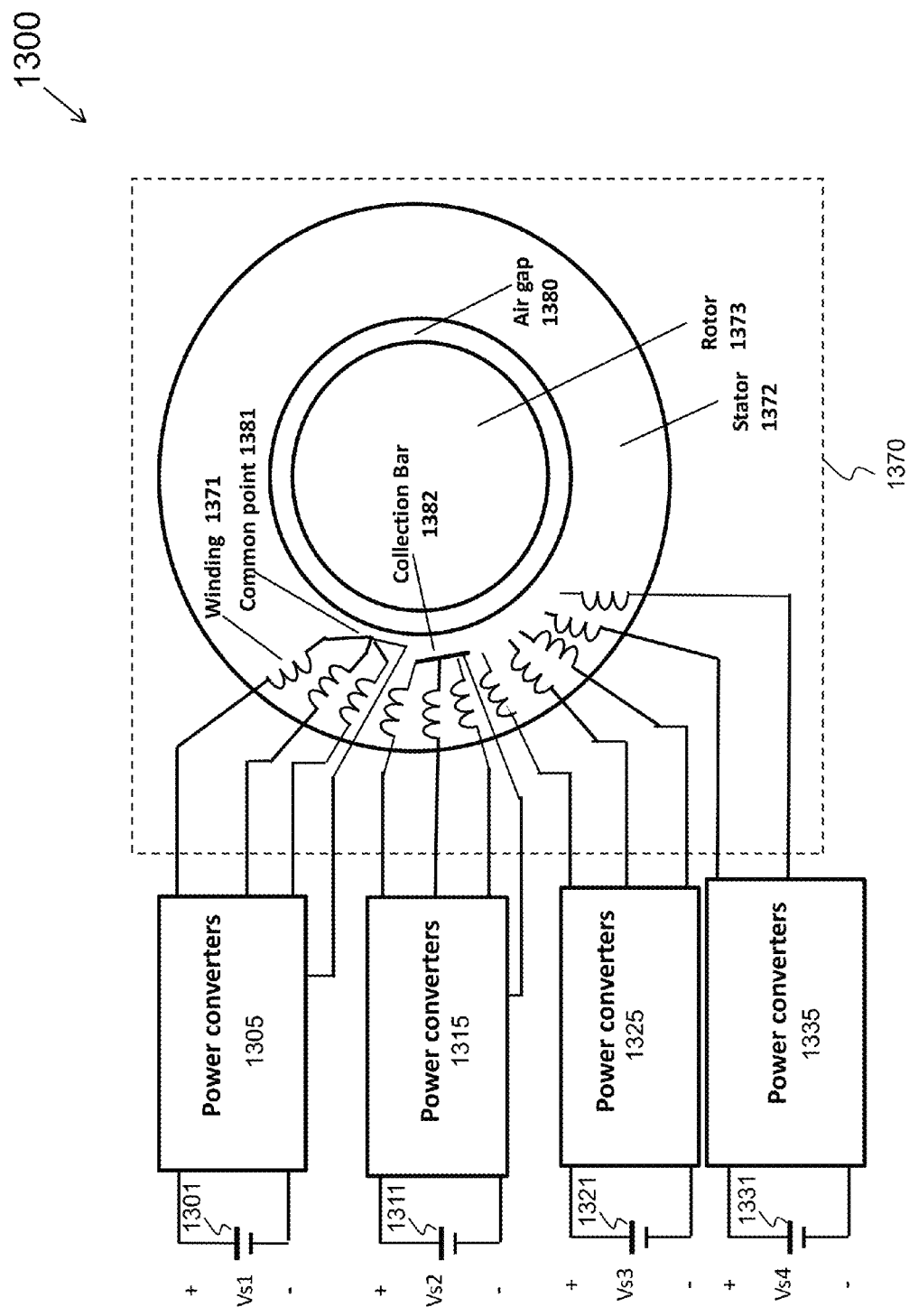
FIG. 13 illustrates a motor drive system in accordance with various embodiments of the present disclosure.

The power delivery to the stator windings (or rotor windings if they are powered externally) can also be coordinated in the design to reduce the power distribution cost, since the power distribution cost may be relatively high considering a high number of power converters needed in a DRIM motor. Considering the significant number of power converters needed to be connected to a motor, it is desirable some times to put two or more windings in series or in parallel so the number of power converters and thus the number of interconnections are reduced. It may also be possible to properly arrange the connecting terminals of windings so both ends of the motor can be used for connecting power converters to windings, and the power converters can be packaged around both ends of the motor. For example, if each slot has a conductor bar in a motor, about 50% of the conductors may be shorted at one end to a collection ring, while the rest be connected to another collection ring on the other end. As a result, both ends have connection terminals for connections to power converters. It is also beneficial to arrange the power converters and the windings in a motor into different groups. In one preferred embodiment, a power converter may power a group winding with several windings in parallel or series. In another preferred embodiment, several power converters may be grouped together to form a power converter group. FIG. 13 shows an embodiment of a technique splitting the power source of the power converters, and also divide the power converters into different groups. The dc power source for the power converters which power the windings of a motor may be from ac-dc power converter for applications such as in most industrial application, or from batteries for applications such as in electric or hybrid vehicles. The dc input power source, such as batteries in a vehicle, can be separated into several parts, and each parts can power a group of power converters coupled to a plurality windings of a DRIM. In FIG. 13, Vs1 1301, Vs2 1311, Vs3 1321 and Vs4 1331 are input power sources which are each a part of a dc power source. The DCIM 1370 comprises a stator 1372, a rotor 1373, an air gap 1380, and a plurality of stator windings illustrated by a winding 1371. A plurality of power converter groups 1305, 1315, 1325 and 1335 are coupled between the stator windings and the input power sources, with each power converter group powers a group of windings. In this way, several lower-voltage input power sources can be utilized to power the DCIM. Usually, a lower voltage power source, such as a lower-voltage battery pack, is easier to design and can be built with lower cost. The currents of windings coupled to a power converter group or in the motor may be controlled collectively (such as in a multi-phase converter) or individually, but coordination should be made between the winding current controls so that all winding currents associated with a converter group are controlled properly. It is also possible to connect a plurality of or all the windings associated to a power converter group together to a common point 1381 or a collection bar 1382 at or near the motor 1370, in order to reduce the cabling to the motor. It may also be beneficial to connect the common point or collection bar to the power converter group (including connecting to the input voltage source) with a group connection lead to facilitate winding current control. Please note that the windings coupled to a power converter group do not need to be located in adjacent slots, and the power converters associated with a given pair of poles do not need to be in a power converter group. It may be beneficial to assign the power converters into a power converter group in such a way that the current flowing through the group connection lead is relatively small in all major operation modes. It may be also beneficial to connect the common points or collection bars in a motor together in the configuration shown in FIG. 13.

Figure 14:
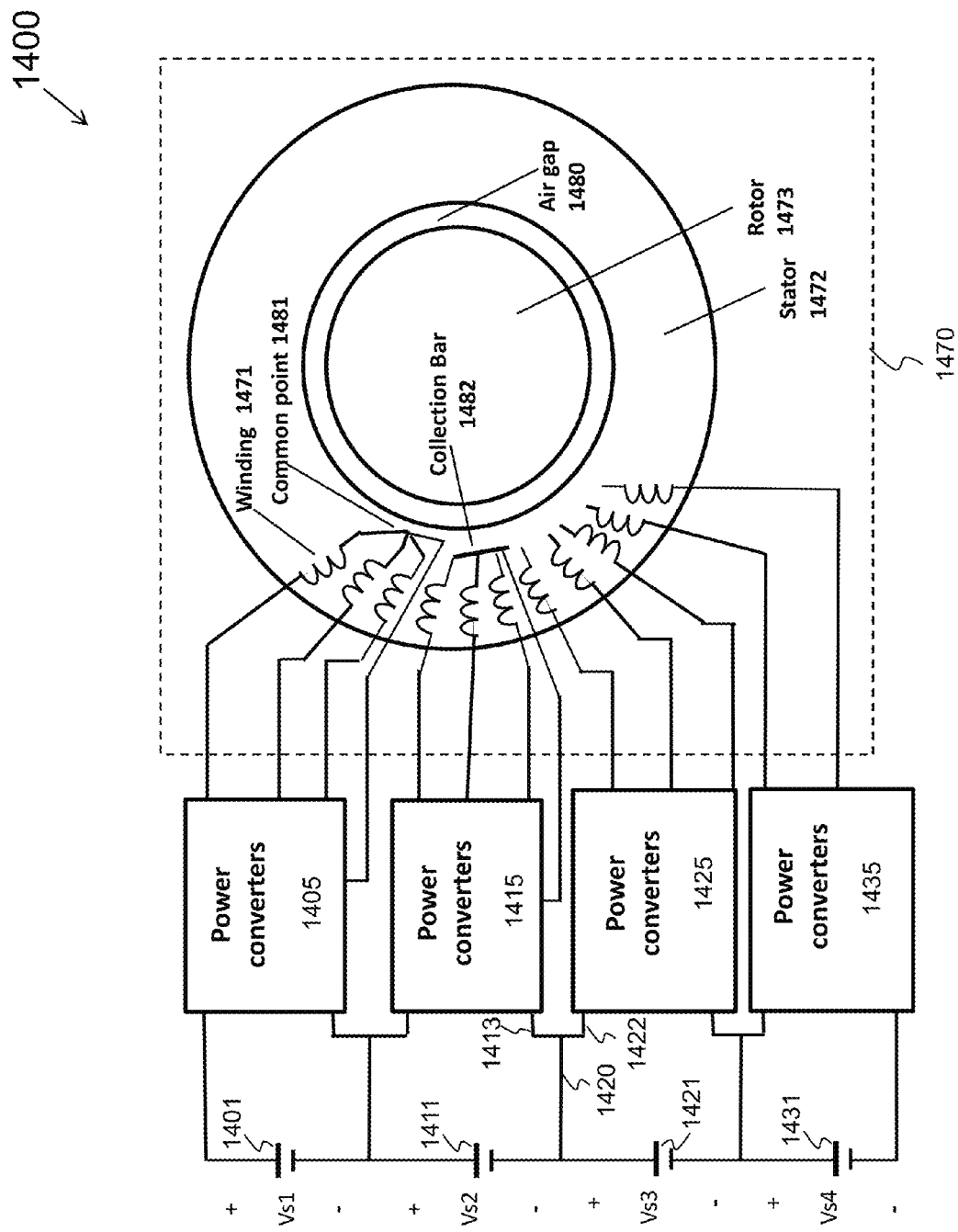
FIG. 14 illustrates a motor drive system in accordance with various embodiments of the present disclosure.

Another preferred embodiment of using split power sources is shown in FIG. 14, where the system configuration is basically the same as in FIG. 13, but the input power sources Vs1 1401, Vs2 1411, Vs3 1421 and Vs4 1431 are put in series. A basic advantage of this configuration is that the cabling between the input power sources and the power converter groups can be easier, because if each input power source has about the same voltage and provides about the same power, the currents on the two leads coupled between a middle tap of the power source and two adjacent power converter groups have about the same dc values but opposite directions, so the sum of these two currents are equal to or close to zero, and only need a small cable to carry it. This allows the cost, size and weight of cabling to be reduced in the power distribution system, which also has switches, contactors, fuses and breakers to control, protect, and manage the power delivery in an application. For example, in FIG. 14, lead 1413 is the negative input power lead of power converter group 1415, and lead 1422 is the positive input power lead of power converter group 1425. Both leads 1413 and 1422 are coupled to the middle tap between input power source Vs2 1411 and input power source Vs3 1421. If Vs2 and Vs3 have about the same voltage and provide about the same power, then the sum of currents in 1413 and 1422 is about zero. That is, the current on lead 1420 is very small, and can use a small cable, wire, or bus bar in the distribution system. Therefore, the physical layout should make leads 1413 and 1422 to be connected together as early as possible at a junction point, and then the junction point is connected to the mid tap between Vs2 1411 and Vs3 1421, through lead 1420 which has much smaller (say less than 60% of) conduction area than the combined conduction area of 1413 and 1422. Furthermore, if possible leads 1413 and 1422 may become a single bus bar with both power converter groups 1415 and 1425 connected to it, so the bus bar itself can be small. In system design, the split input power sources may each have the same or close voltage rating, and each may power the same or a similar number of wingdings. In another embodiment, the input power sources may have different voltages, but the power obtained from a power source may be proportionally to its voltage, so the current in each input leads to the power converter groups may still have the same or close amount. Then every middle tap of the power source can apply the above discussed principle to save cabling cost and reduce the size and weight of the cabling. Again, the currents of windings coupled to a power converter group may be controlled collectively as in a multi-phase converter or individually, but coordination should be made between the winding current controls so that all winding currents associated with a converter group are controlled properly. It is also possible to connect a plurality of or all windings associated to a power converter group together to a common point 1481 or a collection bar 1482 at or near the motor 1470, in order to reduce the cabling to the motor. It may also be beneficial to connect the common point or collection bar to the power converter group to facilitate winding current control. However, in the configuration shown in FIG. 14, windings associated with different power converter groups (and thus different input power sources) should be isolated from each other.

The power sources are usually implemented as batteries or capacitors which get their energy from power electronics equipment such as ac-dc power supplies or battery chargers.

Figure 15:
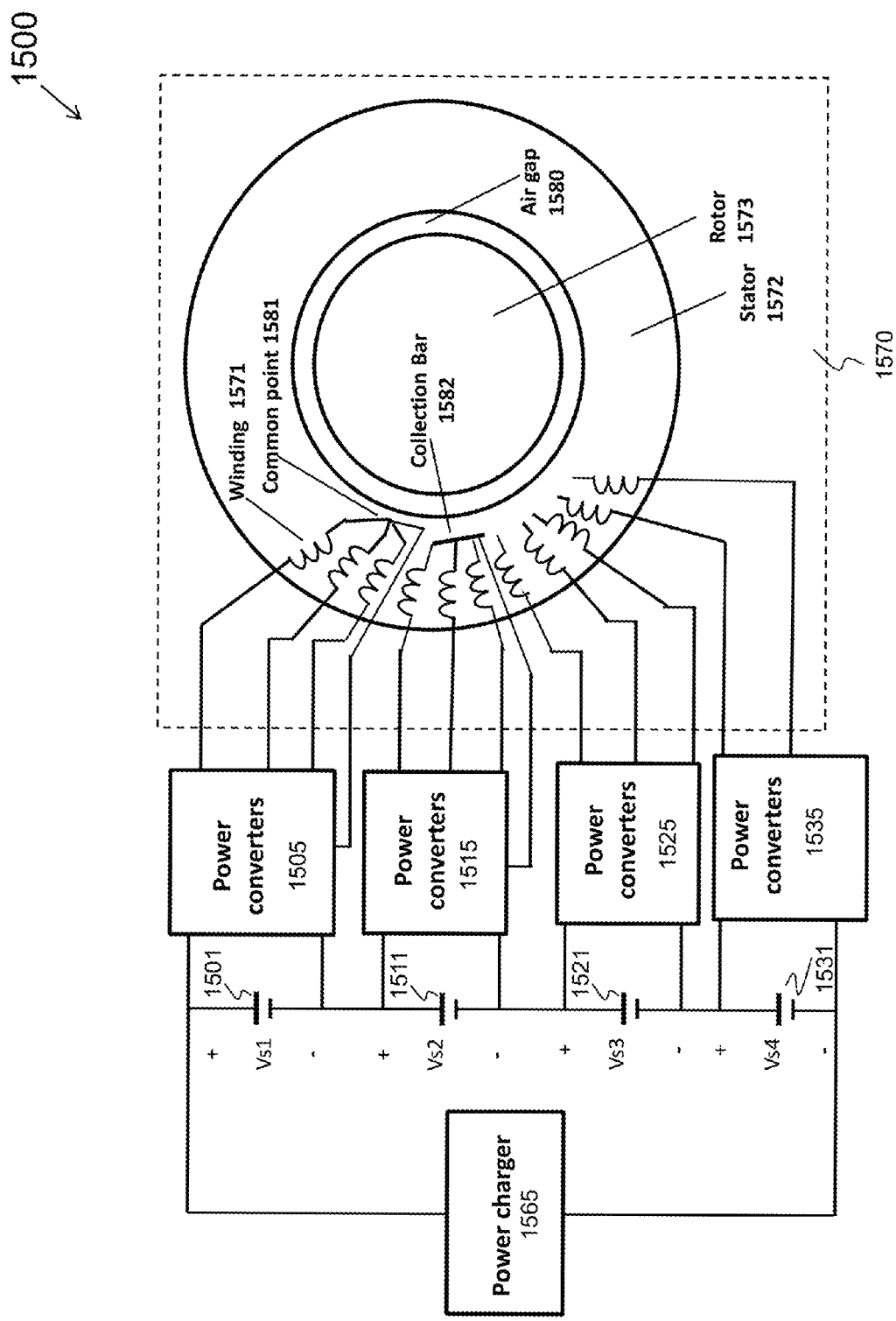
FIG. 15 illustrates a motor drive system in accordance with various embodiments of the present disclosure.

The input sources shown in FIG. 14 can be powered by a battery charge as is shown in FIG. 15. An important task in this case is to maintain the charge balance among the several input power sources in series, Vs1 1501, Vs2 1511, Vs3 1521 and Vs4 1531. While dedicated charge balance circuit can be used for this purpose, the power converters coupled to each input power source can also be configured to provide charge balance function. In one preferred embodiment, a power converter in a power converter group is controlled to work with power distribution system to bypass the input power source or reducing its charging current during a charging operation, when the input source is charged fully or charging to it is not needed. This may be implemented as turning on a plurality of switches in a phase leg, for example turning on both S1 and S2 in the converter shown in FIG. 7A, to allow or control a dc current passing through them. All switches in a phase leg do not be in hard turn-on in this mode. Some of them could be in soft turn-on such as in a linear mode to control or limit the dc current. In another preferred embodiment, the converters in a converter groups may be controlled to produce a dc current between the positive input lead and negative power lead during a charging phase, so the current flowing into the input power source coupled to the converter group is reduced or eliminated. During this operation, some of the windings in the motor may conduct a dc current, but such dc currents do not generate any torque, and thus do not otherwise interference with the motor's operation. In another preferred embodiment, a charge balance mechanism may be implemented by output more power from an input power source with higher charge during a motor operation.

Figure 16:
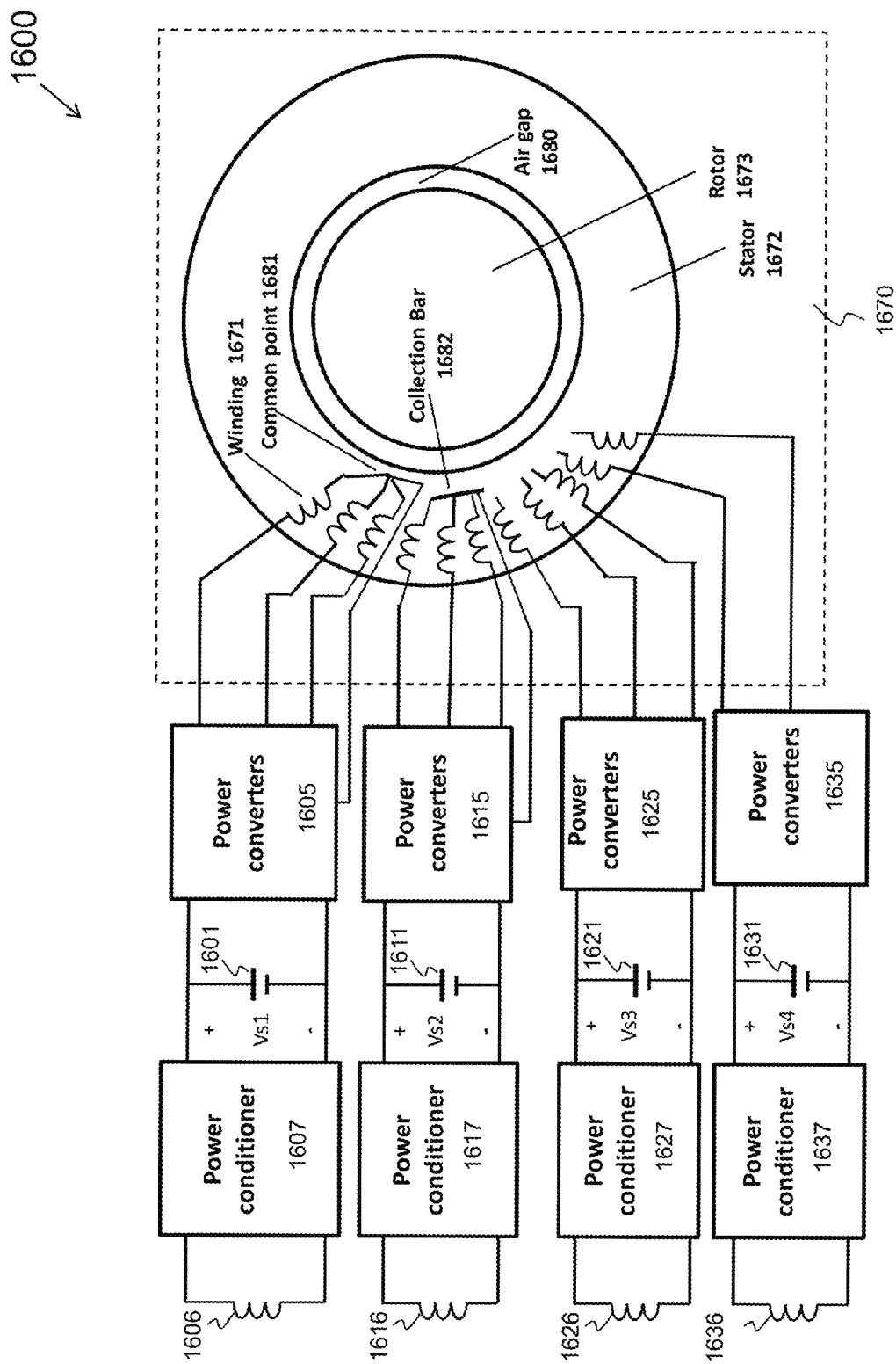
FIG. 16 illustrates a motor drive system in accordance with various embodiments of the present disclosure.

It is also possible to charge each input voltage source directly. FIG. 16 shows one embodiment. In this configuration, each input voltage source is coupled to a dedicated charging circuit. For example, input voltage source Vs1 1601 is coupled to a power conditioner 1607 and a coil 1606. The power conditioner 1607 may be a rectifier circuit of an ac-dc converter, or a receiver circuit and a battery charging circuit of a wireless charger. The coil 1606 may be a secondary winding of a transformer, or a receiver coil of a wireless charger. In one preferred embodiment, some of the coils 1606, 1616, 1626 and 1636 are coupled magnetically. In another preferred embodiment, coils 1606, 1616, 1626 and 1636 are receiver coils of a wireless charger, and are magnetically coupled together and coupled to a transmitter coil of the wireless charger. In one embodiment, coils 1606, 1616, 1626, and 1636 may be connected in series. In another embodiment, input power sources 1601, 1611, 1621 and 1631 may be connected in series. As discussed above, with series connection arrangement the cost, size and weight of distribution cabling can be reduced. It is also possible to connect a plurality of or all the windings associated to a power converter group together to a common point 1681 or a collection bar 1682 at or near the motor 1370, in order to reduce the cabling to the motor. It may also be beneficial to connect the common point or collection bar to the power converter group to facilitate winding current control.

The discussion so far is focused on rotating electrical machines. However, the technologies discussed can be applied to other forms of electrical machines, such as linear motors, with straight-forward modifications.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device comprising
   a controller comprising a pole number decision block, a system controller means, and a current control means, the controller is configured to control a plurality of power converter groups and dynamically adjust the number of poles of a motor/generator and the number of phases in a pair of poles, wherein:
   the motor/generator has a plurality of winding groups, wherein each winding group comprises a plurality of slot windings placed in a plurality of slots, and each slot winding is configured to be dynamically assigned to a phase and a pair of poles; and
   a power converter group comprises a plurality of power converters, wherein each power converter group is coupled between a winding group and an input voltage source, and wherein:
      each power converter is coupled between the input voltage source and a slot winding in the winding group; and
      the power converter group is configured to control currents of the slot windings in the winding group; and
   the controller is configured to regulate a synchronous speed of a first moving magnetic field generated by currents in the slot windings within a first pair of poles to be approximately equal to a synchronous speed of a second moving magnetic field generated by currents in the slot windings within a second pair of poles.

2. The device of claim 1, wherein a local frequency of winding currents in a pair of poles is adjusted in response to the number of slots in the pair of poles.

3. The device of claim 2, wherein an amplitude and a phase angle of magnetizing currents of the slot windings in a pair of poles are controlled so that a smooth rotating magnetic field is generated in an air gap of the motor/generator.

4. The device of claim 1, wherein the first and second input voltage sources are connected in series.

5. The device of claim 4, wherein a power converter group is controlled to maintain a charge balance of the first and second input voltage sources.

6. The device of claim 1, wherein the controller determines the number of poles, the number of phases and the magnetic field strength in a pair of poles in consideration of better system efficiency.

7. The device of claim 1, wherein the currents of active slot windings within a first pair of poles having a de-activated slot are controlled to generate a moving magnetic field whose positive-sequence component is in synchronization with a moving magnetic field generated by winding currents in a second pair of poles.

8. A system comprising
a motor/generator having a plurality of winding groups, wherein each winding group comprises a plurality of slot windings placed in a plurality of slots, wherein a slot winding is configured to be dynamically assigned to a phase and a pair of poles; and
the winding groups are coupled to a plurality of input voltage sources through
a plurality of power converter groups, wherein each converter group comprises a plurality of power converters, and wherein
a first power converter group is coupled between a first input voltage source and a first group of slot windings,
a second power converter group is coupled between a second input voltage source and a second group of slot windings, and
the power converter groups are configured to be controlled by a slot control system, wherein the slot control system is configured to dynamically adjust the number of poles of the motor/generator and the number of phases in pair of poles.

9. The system of claim 8, wherein an input voltage source is coupled to a first coil through a first power conditioner, and wherein the first coil is a secondary winding of a transformer in a power converter or a receiver coil in a wireless charger.

10. The system of claim 9, wherein a second coil is coupled to an input voltage source through a second power conditioner, and wherein the first coil is magnetically coupled to the second coil.

11. The system of claim 8, wherein a first power lead coupling the first power converter group to a first node of the first input voltage source is significantly smaller in size than a second power lead coupling the first power converter group to a second node of first input voltage source.

12. The system of claim 8, wherein the first input voltage source is in series with the second input voltage source, and the first power converter group is controlled to maintain a charge balance between the first input voltage source and the second input voltage source.

13. The system of claim 8, wherein the power converter groups are controlled to regulate a synchronous speed of a first moving magnetic field generated by currents in the slot windings within a first pair of poles to be approximately equal to a synchronous speed of a second moving magnetic field generated by currents in the slot windings within a second pair of poles.

14. A method comprising:
providing a motor/generator having a plurality of winding groups, wherein each winding group has a plurality of slot windings placed in a plurality of slots, wherein a slot winding is configured to be dynamically assigned to a phase and a pair of poles;
providing a plurality of power converter groups coupled to a plurality of input voltage sources, wherein each power converter group has a plurality of power converters;
coupling a first power converter group between a first input voltage source and a first winding group;
coupling a second power converter group between a second input voltage source and a second winding group; and
configuring the power converter groups to control currents of the slot windings; and
dynamically adjusting the number of poles of the motor/generator and the number of phases in a pair of poles.

15. The method of claim 14, further comprising controlling winding currents of the motor/generator such that the motor/generator has a first number of poles at a higher speed, and a second number of poles at a lower speed, wherein the first number is smaller than the second number, and wherein the number of phases in a pair of poles is adjusted in response to a change of the number of poles.

16. The method of claim 14, further comprising making a ratio of the power output from the first power converter group to a voltage of the first input voltage source approximately the same as a ratio of the power output from the second power converter groups to a voltage of the second input voltage source.

17. The method of claim 14, further comprising selecting the conduction area of a power lead coupled to the center tap of the first and second input voltage sources to be significantly less than the combined conduction area of the other two power leads coupled to the first and second input voltage sources.

18. The method of claim 14, further comprising improving a system efficiency dynamically by adjusting the number of poles, the number of phases and the magnetic field strength in a pair of poles in an operation.

19. The method of claim 14, further comprising regulating a synchronous speed of a first moving magnetic field generated by the currents in the windings within a first pair of poles to be approximately equal to a synchronous speed of a second moving magnetic field generated by the currents in the windings within a second pair of poles.

20. The method of claim 14, further comprising connecting the first and second input voltage sources in series and achieving a charge balance function by controlling the first power converter group to generate a dc current flows through the first winding group.

* * * * *